United States Patent
Sweetland

(10) Patent No.: US 11,453,087 B2
(45) Date of Patent: Sep. 27, 2022

(54) ADDITIVE MANUFACTURING SYSTEM WITH GAS FLOW HEAD

(71) Applicant: VulcanForms Inc., Waltham, MA (US)

(72) Inventor: Matthew Sweetland, Bedford, MA (US)

(73) Assignee: VulcanForms Inc., Burlington, MA (US)

(*) Notice: Subject to any disclaimer, the term of this patent is extended or adjusted under 35 U.S.C. 154(b) by 438 days.

(21) Appl. No.: 16/531,691

(22) Filed: Aug. 5, 2019

(65) Prior Publication Data

US 2020/0039000 A1 Feb. 6, 2020

Related U.S. Application Data

(60) Provisional application No. 62/715,028, filed on Aug. 6, 2018.

(51) Int. Cl.
*B23K 26/342* (2014.01)
*B33Y 30/00* (2015.01)
(Continued)

(52) U.S. Cl.
CPC .......... *B23K 26/342* (2015.10); *B23K 26/064* (2015.10); *B23K 26/082* (2015.10);
(Continued)

(58) Field of Classification Search
CPC ............... B23K 26/342; B23K 26/082; B23K 37/0235; B23K 26/127; B23K 26/0876;
(Continued)

(56) References Cited

U.S. PATENT DOCUMENTS 5,358,373 A 10/1994 Hablanian
9,731,450 B2 8/2017 Echigo et al.
(Continued)

FOREIGN PATENT DOCUMENTS

WO WO 2016/102970 A1 6/2016
WO WO 2019/072359 A1 4/2019

OTHER PUBLICATIONS

PCT/US2019/045106, Oct. 9, 2019, Invitation to Pay Additional Fees.
(Continued)

*Primary Examiner* — Joel M Attey
*Assistant Examiner* — Rachel R Rizzo
(74) *Attorney, Agent, or Firm* — Wolf, Greenfield & Sacks, P.C.

(57) ABSTRACT

An additive manufacturing system includes a build surface, one or more laser energy sources, and an optics assembly. Exposure of a layer of material on the build surface to laser energy from the optics assembly melts at least a portion of the layer of material. A gas flow head is coupled to the optics assembly and defines a partially enclosed volume between the optics assembly and the build surface. The gas flow head includes a gas inflow through which a supply gas flows into the gas flow head, a gas outflow through which a return gas flows out of the gas flow head, and an aperture arranged to permit transmission of the laser energy through the gas flow head to the build surface. The supply gas and return gas define a gas flow profile within the gas flow head.

21 Claims, 18 Drawing Sheets

(51) Int. Cl.
*B23K 26/064* (2014.01)
*B23K 26/14* (2014.01)
*B23K 26/142* (2014.01)
*B23K 26/082* (2014.01)

(52) U.S. Cl.
CPC ........ *B23K 26/142* (2015.10); *B23K 26/1464* (2013.01); *B23K 26/1476* (2013.01); *B33Y 30/00* (2014.12)

(58) Field of Classification Search
CPC ............ B23K 26/0006; B23K 15/0093; B23K 15/002; B23K 15/0086; B23K 26/702; B23K 26/70; B23K 26/123; B23K 26/22; B23K 10/006; B23K 26/16; B23K 26/0853; B23K 26/346; B23K 15/0026; B23K 15/02; B23K 26/32; B23K 26/1224; B23K 10/027; B23K 26/0884; B23K 26/354; B23K 26/073; B23K 37/0426; B23K 37/0408; B23K 26/0846; B23K 26/36; B23K 15/06; B23K 26/03; B23K 26/704; B23K 15/0006; B23K 15/0013; B23K 26/032; B23K 26/083; B23K 26/703; B23K 26/0732; B33Y 30/00; B33Y 10/00; B33Y 40/00; B33Y 50/02; B33Y 70/00; B33Y 80/00; B33Y 99/00; B29C 64/371; B29C 64/153; B29C 64/268; B29C 64/393; B29C 64/165; B29C 64/188; B29C 64/35; B29C 64/171; B29C 64/255; B29C 64/264; B29C 64/245; B29C 64/40; B29C 64/194; B29C 64/364; B29C 64/205; B29C 64/277; B29C 64/214; B29C 64/286; B29C 64/295; B29C 64/379; B29C 64/386; B22F 10/20; B22F 12/00; B22F 12/70; B22F 1/0088; B22F 3/24; B22F 3/105; B22F 3/003; B22F 10/70; B22F 10/40; B22F 3/004; B22F 10/30; B22F 10/12; B22F 12/20; B22F 12/17; B22F 12/43; B22F 10/34; B22F 10/36; B22F 10/28; B22F 12/90; B22F 10/00; B22F 10/50; B22F 10/77; B22F 12/49; B22F 10/10; B22F 10/322; B22F 12/45; B28B 17/0081; B28B 1/001; B28B 17/0072; H05B 6/80; H05B 6/68; C04B 35/64; C04B 35/565; C04B 35/5626; C04B 35/522; H01J 37/32834; H01J 37/3244; H01J 37/32449; F04D 17/168; F04D 19/04; F04D 19/042; F04D 19/046; F04D 23/008; F04D 29/542; G02B 26/101; G02B 26/0816; G02B 19/0028; G02B 15/04; G02B 7/1827; G02B 7/16; G02B 15/10; G02B 7/14; G02B 19/0047; G02F 1/0136; G02F 1/135; G02F 1/133362; G05B 17/02; H01S 5/4012; H01S 5/005; B25J 11/00; G06F 30/23
See application file for complete search history.

(56) References Cited

U.S. PATENT DOCUMENTS

| | | | |
|---|---|---|---|
| 9,827,632 | B2 | 11/2017 | Eibl et al. |
| 9,956,612 | B1 | 5/2018 | Redding et al. |
| 2003/0094135 | A1 | 5/2003 | Komiya et al. |
| 2016/0114432 | A1* | 4/2016 | Ferrar .................. B23K 26/082 219/76.12 |
| 2016/0114531 | A1 | 4/2016 | Chuang et al. |
| 2016/0121398 | A1* | 5/2016 | Schlick ................... B22F 10/20 425/11 |
| 2016/0136730 | A1* | 5/2016 | McMurtry ............ B22F 12/224 359/290 |
| 2016/0136731 | A1* | 5/2016 | Dimter .................. B29C 64/153 419/53 |
| 2016/0184927 | A1 | 6/2016 | Heinrici et al. |
| 2016/0325378 | A1 | 11/2016 | Ohno et al. |
| 2017/0144254 | A1 | 5/2017 | Buller et al. |
| 2017/0182556 | A1 | 6/2017 | Ramaswamy et al. |
| 2018/0200792 | A1 | 7/2018 | Redding et al. |

OTHER PUBLICATIONS

PCT/US2019/045106, Dec. 6, 2019, International Search Report and Written Opinion.
Invitation to Pay Additional Fees for International Application No. PCT/US2019/045106, dated Oct. 9, 2019.
International Search Report and Written Opinion for International Application No. PCT/US2019/045106, dated Dec. 6, 2019.
Extended European Search Report for European Application No. 19846238.4, dated Jun. 7, 2022.

* cited by examiner

ADDITIVE MANUFACTURING SYSTEM WITH GAS FLOW HEAD

RELATED APPLICATION

This application claims priority under 35 U.S.C. § 119(e) to U.S. Provisional Application Ser. No. 62/715,028, entitled "ADDITIVE MANUFACTURING SYSTEM WITH GAS FLOW HEAD", filed Aug. 6, 2018, which is herein incorporated by reference in its entirety.

FIELD

Disclosed embodiments are related to systems for additive manufacturing.

BACKGROUND

Many methods of metal additive manufacturing are currently available in the market. The methods can be separated by source of material (powder, wire, film etc.) and form of energy addition to obtain melting/bonding (laser melting, e-beam melting, welding arc, sintering etc.). The resolution, accuracy and obtainable feature size of the end part for a given process is based on the initial material form and the ability to control the energy placement for metal fusion. The effective rate of a given process is typically limited by the ability to delivery energy into the build surface in a controlled manner.

In a selective laser melting processes for metal additive manufacturing, one or more laser spots are typically scanned over a thin layer of metal powder. The metal powder that is scanned with the laser spot is melted and fused into a solid metal structure. Once a layer is completed, the structure is indexed, a new layer of metal powder is laid down and the process is repeated. If an area is scanned with the laser spot on the new layer that is above a previous scanned area on the prior layer, the powder is melted and fused onto the solid material from the prior layer. This process can be repeated many times in order to build up a 3-dimensional shape of almost any form.

Both single laser and multi-laser systems are used in selective laser melting processes. For example, some systems use a pair of galvanometer mounted mirrors to scan each laser beam over the desired pattern on the build surface. Some systems use motion stages to scan the laser over the build surface. Moreover, some systems use a combination of motion stages and galvanometers to scan the laser over the build surface. Systems that use galvanometers as part of the scanning method often use f-theta or telecentric lens to help keep the incident angle of the laser beam onto the build surface as close to perpendicular as possible for a given build surface size. The spacing between the final optical component of any laser path (e.g., the final optics, galvanometer, mirror, telecentric lens or f-theta lens) may be on the order of a few millimeters up to a hundred centimeters or more.

SUMMARY

In one embodiment, an additive manufacturing system comprises a build surface, one or more laser energy sources, and an optics assembly movable relative to the build surface and configured to direct laser energy from the one or more laser energy sources toward the build surface. Exposure of a layer of material on the build surface to the laser energy melts at least a portion of the layer of material. The system further comprises a gas flow head coupled to the optics assembly and defining a partially enclosed volume between the optics assembly and the build surface. The gas flow head includes a gas inflow through which a supply gas flows into the gas flow head, a gas outflow through which a return gas flows out of the gas flow head, and an aperture arranged to permit transmission of the laser energy through the gas flow head to the build surface. The supply gas and return gas define a gas flow profile within the gas flow head.

In another embodiment, a method for additive manufacturing includes directing laser energy from one or more laser energy sources through an optics assembly and toward a build surface, exposing a layer of material on a build surface to the laser energy, and melting at least a portion of the layer of material due to exposure of the portion to the laser energy. The optics assembly is movable relative to the build surface. The method further comprises flowing a supply gas into a gas flow head through a gas inflow of the gas flow head, flowing a return gas out of the gas flow head through a gas outflow of the gas flow head, and generating a gas flow profile within the gas flow head, at least in part, due to the flow of the supply gas into the gas flow head and the flow of the return gas out of the gas flow head. The gas flow head is coupled to the optics assembly.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
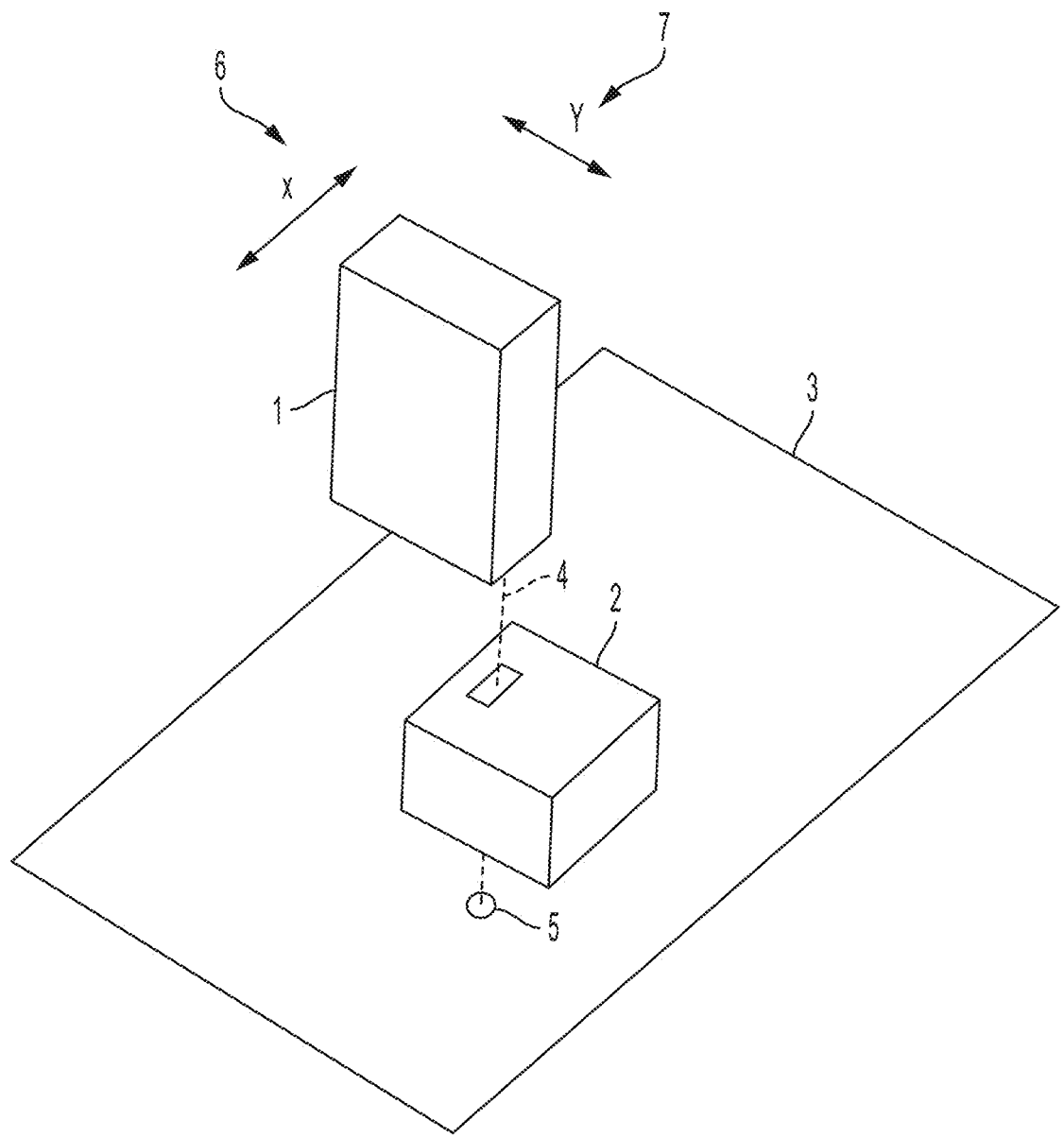
FIG. 1 is a schematic representation of an additive manufacturing system including a gas flow head, according to one embodiment.

The inventors have recognized and appreciated that many factors may affect the behavior of a melt pool in a selective laser melting system at the point of laser incidence on a layer of powdered material on a build surface. These factors can include the type of metal powder used in the process, the powder layer thickness, the incident energy of the laser beam, the focal size of the laser beam, the scanning velocity of the laser beam, the thermal history of previous scans, and type of surrounding gas environments. In all cases, near the area of the melt pool, dynamics within the melt pool results in the fume generation and some degree of gasification of the molten metal. In some instances, these generated fumes can interfere with the laser beam.

Moreover, the gasification and rapid expansion of powdered and molten metal can also cause the melt pool to eject particles upward and away from the melt pool. These ejected particles can include unmelted metal powder particles, partially fused powder particles, and particles of molten metal that may subsequently cool and solidify after being ejected from the melt pool. Partially fused powder particles can take on sizes that are multiple times larger than the unprocessed base powder. Additionally, molten metal droplets that are ejected and subsequently cool can take on a range of shapes and sizes. Due to their high surface areas and high temperatures at the point of ejection, such ejected particles can react with trace elements in the surrounding gas environment to form compounds with very different physical properties from either the source metal powder or the fused metal structure.

The inventors have appreciated that the various types of ejected particles (e.g., individual powder particles, partially fused powder particles, cooled molten droplets) can cause a number of problems as a laser continues to scan over the powder layer, as well as when the laser scans over subsequent layers. For example, large sintered particles and cooled molten droplets may be detrimental to the build process. The laser processing of subsequent tracks may attempt to remelt the large sintered particles and cooled molten droplets, which may result in inclusions in a final built component. These inclusions can significantly affect the mechanical properties of the final built component, such as its strength, stiffness, resistance to fatigue, and/or density. Also, as the laser(s) continue to scan and particles are ejected from a particular laser trajectory, unmelted, large sintered particles and cooled molten droplets may be included in subsequent laser trajectories. This, if accumulated over several layers, may result in overbuild of materials in regions where these ejecta preferentially land. This overbuild may cause distortion and dimensional inaccuracy in the final part.

In some instances, ejected particles may land back on the powder bed surface on the build surface, which may disturb the smooth surface and cause holes and/or mounds to form. If one of these resulting holes is scanned by the laser(s), then the amount of material at that location may be insufficient to form a full height molten layer. As a result, the surface will be lower than other areas after the melt pool solidifies. When a subsequent powder layer is deposited on the build surface, the powder layer will be thicker at this location than than in surrounding areas, and if that area is again scanned by the laser beam(s), the incident energy may not be sufficient to melt the full depth of the powder. This can result in unprocessed voids that contain unmelted powder in the final built component or part. In a similar fashion, if an ejected particle has formed a mound on the powder bed surface, and the mound is subsequently scanned before the next layer is laid down, the incident laser energy at the location of the mound may not be sufficient to melt all of the powder though the thickness of the mound. This may result in a trapped void of unmelted powder. If the mound is sufficiently high and is scanned and melted, it may produce a high point on the solidified structure that may then cause contact and potential damage to a recoating blade. Over time, repeated damage to the recoating blade can result in an inability to properly spread powder layers, and may cause the recoating mechanism to seize, thereby resulting in a total build failure.

In addition to the above, the inventors have recognize that particles ejected from the melt pool can also cause other problems. For example, partially fused particles and cooled molten particles that are ejected from the melt pool can be many times the size of the metal powder that is spread on the build surface during the normal build process. These large particles may be more likely to cause holes and mounds in the powder bed surface when they land due to their larger mass. Also, these larger particles may not process in the same manner as the smaller and more uniformly spread powder if they are in areas that are scanned after they land. For instance, their large relative mass and non-uniform shape can prevent them from being fully melted when being scanned by the incident laser(s). This again can cause the formation of voids or unmelted powder areas in a final built component or part. Moreover, molten droplets that solidify after ejection from the melt pool can form compounds that will not melt and fuse within the melt pool if they are subsequently scanned. The resulting void or unprocessed particle can again affect the mechanical and physical properties of the final part.

In some instances, ejected particles that are large compared to the nominal size of the metal powder that is spread on the build surface can also cause problems during the recoating process and on subsequent process layers during an additive manufacturing process. For example, ejected particles may be so large that they get caught and dragged along by the recoating blade. These dragged particles may cause uneven tracks in the powder bed surface that can causes subsequent processing challenges. These tracks may cause too much build up in some areas of subsequent scans by causing too much powder to be deposited during recoating. They may cause spots in other areas of the scanned area due to insufficient powder in some tracks. These high and low areas may cause the distortion or stresses in the final part. Large particles can also end up partially sintered to the external surface resulting in an increased surface roughness and an overall decreased build quality.

Such high and low areas in the melt process that are a result of a disturbed powder bed surface can also lead to delamination of the various build layers of a manufactured component or part. For example, upon cooling, each layer may shrink due to the changing temperature. If too much powder has accumulated in a given area and was not fully processed during a prior laser scanning step, this may produce a weak interface between that layer and previous layers. As this last layer cools and shrinks, it can pull away from the previous layers and delaminate such that the produced part does not form a solid structure. A similar effect can happen if too many partially sintered particles land in a given area on the build surface and are subsequently scanned.

Furthermore, the inventors have recognized that in some instances, particles ejected from a melt pool may cause deposits on the optical components of an additive manufacturing system. Such deposits can interfere with the incident laser beam path, which may result in a non-uniform illumination pattern at the point of incidence of the laser beam(s). In some cases, this may affect the melt pool dynamics and force a slower processing speed to maintain a desired quality level of a final built component. Moreover, if these deposits become sufficiently dense, they can cause a substantial portion of the incident laser energy to be absorbed by the optical component(s). This can cause localized heating and damage to the components, which may lead to failure of the build process and or additive manufacturing system. Even if there are not sufficient deposits to cause permanent damage to the optical components, the process may have to be halted on a periodic basis to clean the optical path. Halting the build process to clean the optical path, or for any other reason, can introduce thermal and mechanical stresses due to excessive cooling and reheating of the produce parts. In some cases, a build that has to be halted or interrupted during the process, even between layers, can be considered to be a failed build and the part cannot be used.

Fumes given off from the melt pool during an additive manufacturing process may contain very small particulate matter that can drift through a gas environment of an additive manufacturing system. These fumes can cause deposits and films to form on the walls and structures of the system over time. Such deposited film layers may have to be periodically cleaned and may cause wear and accelerated deterioration of mechanical components. In some cases, these films can be reactive and may oxidize rapidly when exposed to ambient air during routine machine maintenance. Accordingly, containment and filtering of these fumes is desirable.

In view of the above, the inventors have recognized and appreciated numerous benefits associated with additive manufacturing systems that include a gas flow across the powder bed surface. Such gas flows may address one or more of the above-noted issues caused by ejected particles during an additive manufacturing process. For example, a gas flow may entrain the ejected particles and fumes and carry them to an external filter unit where they can be safely trapped and removed from the system. In some embodiments, the gas flow may be sufficiently fast so as to capture and entrain most or all of the particles. Moreover, in some embodiments, the gas flow may be uniform over a portion of the build surface. For example, if the flow is too slow, larger particles may not be entrained and may fall back onto the build surface, and if the flow is not uniform, the ejected particles over some parts of the build surface may not be fully entrained. Also, in order to produce high quality parts, the thermal history of the entire build surface should be as uniform as possible. If the gas flow over the build surface is not uniform, some areas may be subject to more convective cooling that area with less air flow. Variations in surface cooling can increase thermal stress and part deformation during processing.

In some instances, the gas flow over the build surface may be limited such that the gas flow does not adversely affect the powder surface. For example, if the gas velocities are too high close to the build surface, the shear force of the gas can deform the uniformity of the powder surface. Non-uniform powder surfaces can lead to build errors and/or poor processing conditions.

As build volumes and the size of build surfaces increases, it becomes harder and harder to produce a uniform gas field over the build surface that is both sufficiently fast enough to entrain most particles while keeping surface velocities low enough everywhere to prevent deformation or disturbance of the powder surface. For example, directed gas jets employed in existing systems diffuse over their length, so a jet sufficient to produce a suitable velocity to entrain particles on the far side of the build surface may cause undesirable turbulence and gas velocities that may deform and disturb the powder surface on the near side of the build surface. Also, as build volumes increase, the required volumetric gas flow to ensure uniform gas flow across the build surface can become large. This typically requires large fans or blowers which increases energy usage and equipment cost.

In view of the foregoing, the inventors have recognized and appreciated numerous benefits associated with additive manufacturing systems constructed and arranged to produce a local entrained gas flow close to the melt pool with a high velocity of the gas flow but with a low total circulating volume of gas.

According to some aspects, the systems and methods described herein may be used with powder bed fusion/ selective laser melting systems that have optical components positioned above a powder bed surface and arranged to scan across the surface with one or more motion stages or by motion stages combined with short galvanometer motions. Short galvanometer motions may include galvanometer scan lengths that are less than the dimensions of the build surface. In some embodiments, the systems may operate within a sealed inert environment where entrained gases from the volumes away from the melt pool region do not introduce oxygen or moisture to the melt pool region.

In some embodiments, an additive manufacturing system may include a gas flow head positioned between an optics assembly (e.g., one or more optical components of the laser beam system) and powder surface. The gas flow head may be mounted to the optics assembly (e.g., to one or more motion stages that produce at least some of the scanning motion of the incident laser beam). The gas flow head may include both a source of gas flow, such as a gas inflow to provide positive pressure compared to ambient conditions, and a return gas flow, such as a gas outflow to provide negative pressure compared to ambient conditions. The source and return flows may be dependent on each other, or they may be independently controlled. The source and return flow may be arranged to create a local gas flow across the melt pool region that entrains ejected particles and fumes. This flow may be directly exposed to the powder surface or it may be secondarily shielded by a mask with smaller apertures matched to the melt pool and incident laser beam. In some embodiments, the gas flow and resulting gas velocity profile may be induced by only the forced volumetric gas flow, or the velocity profile may also be controlled by a secondary gas velocity generator or velocity inducer such as a spinning disc. The disc may be a solid shape that does not intersect with the optical path. In other embodiments, a velocity generator may be formed from an optically transparent material that allows the laser beam(s) to pass through the spinning disc to further protect upstream optical components.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of an additive manufacturing system comprising of an optical assembly such as optics unit 1 that directs one or more incident laser beams 4 through a gas flow head 2 and onto a build surface, such as powder bed surface 3. The incident laser beam(s) 4 produce a melt pool 5 on the powder bed surface 3. The position of the melt pool 5 on the powder bed surface 3 is set by moving the optics unit 1 along directions 6 and 7 relative to the build surface, for example using motion stages.

Figure 2:
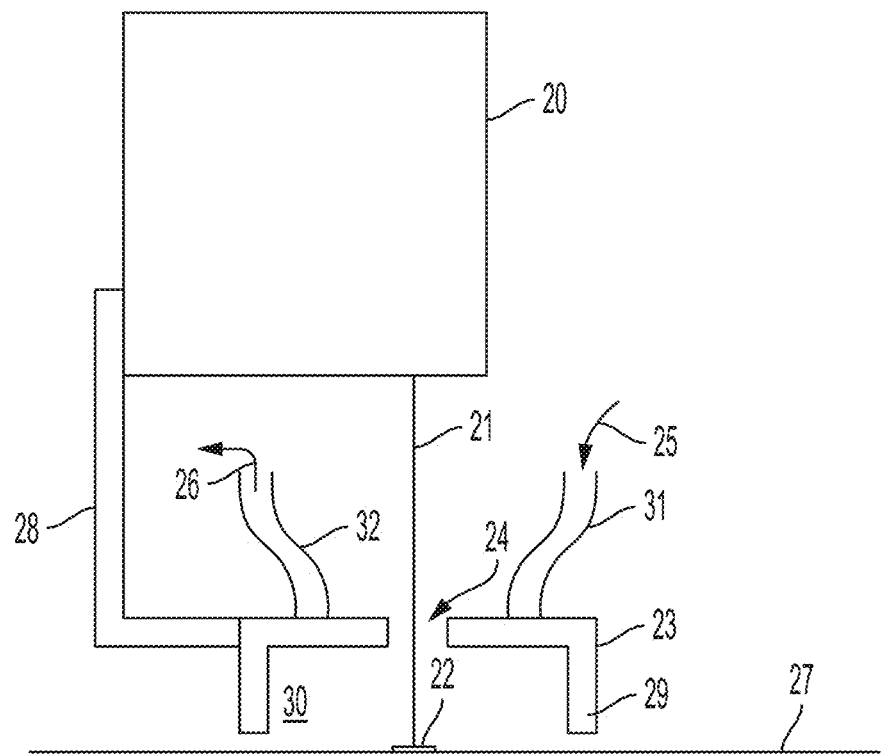
FIG. 2 is a schematic representation of an optics unit and a gas flow head, according to one embodiment.

A detailed side view of an optics unit 20 and gas flow head 23 is shown in FIG. 2. The gas flow head 23 is attached to the optics unit 20 with a mounting bracket 28. In this embodiment, this arrangement maintains the gas flow head 23 in a fixed position relative to the optics unit 20. In this manner, as the optics unit 20 is scanned over the powder bed surface 27, the gas flow head 23 is also scanned over the powder bed surface 27 at substantially the same velocity as the optics unit. The gas head 23 includes an outer housing 29 that at least partially encloses a volume 30 above the powder bed surface 27. A supply of gas 25 is supplied into the gas flow head 23 via a gas inflow 31. A return gas supply 26 is ported out of the gas head using a gas outflow 32. The supply gas and return gas flow can be generated using any suitable velocity generating structures, including, but not limited to, one or more fans, blowers, compressed gas supplies, mechanical compressor systems, and/or vacuum pumps. The supply gas flow and return gas flow can be linked together and matched using a closed circulation system, or they can be established with independent flow controls such that each can be individually controlled. The incident laser beam 21 from the optics unit can pass through the gas flow head through an aperture 24 in the top of the gas head. The incident laser beam is arranged to create a melt pool 22 on the powder bed surface.

While the above-described embodiment includes a gas flow head directly coupled to an optics unit such that the optics unit and gas flow head move relative to a powder bed at substantially the same velocity, it should be understood that other arrangements may be suitable. For example, in some embodiments, the gas flow head and optics unit may be coupled to a common gantry system (or other suitable structure) that scans both the optics unit and gas flow head across the powder bed at substantially the same velocity. In other embodiments, the optics unit and gas flow head may have separate respective gantry systems (or other suitable structures) that move each of the optics unit and gas flow head relative to the build surface. In such embodiments, these separate systems may be operated such that the gas flow head and optics unit are scanned across the powder bed at substantially the same velocity.

Figure 3:
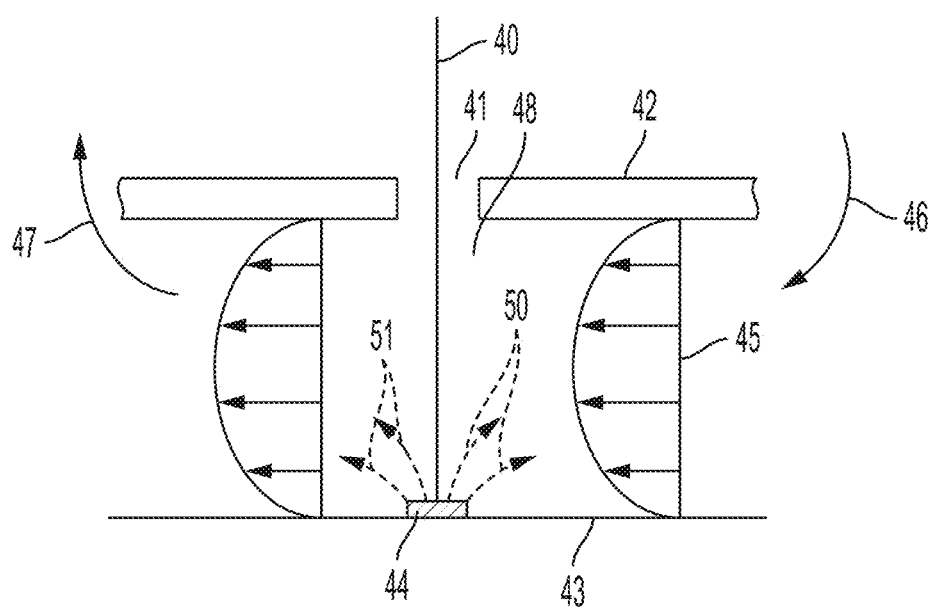
FIG. 3 is a schematic representation of gas velocity profiles within a portion of a gas flow head, according to one embodiment.

Referring now to FIG. 3, a portion of a gas head 42, aperture and melt pool are described in more detail. In the depicted embodiment, the incident laser beam 40 passes through the gas flow head aperture 41, through the partially enclosed volume 48 and onto the powder bed surface 43. A melt pool 44 is established on the powder surface and particulate matter is ejected upwards and away from the powder surface. A gas flow profile 45 is established within the partially enclosed volume 48 within the gas flow head. The specific shape and magnitude of the velocity profile is set by the volumetric flow rate of the supply gas 46 and return gas 47, as well as the dimensions of the enclosed volume 48 and the velocity of the optics unit/gas head over the powder bed surface. A higher gas volume will produce a larger velocity profile and a steeper velocity gradient at the powder bed surface. Both the dimensions of the gas head and the volumetric flow rate of the circulating gas can be modified to produce a velocity profile that entrains all the ejected particles while preventing any distortion of the powder bed surface.

Depending on the particular embodiment, a flow velocity of gas within the gas flow head (e.g., across an area corresponding to an aperture in the gas flow head) may be between about 0.5 meters per second and about 3 meters per second. For example, the flow velocity may be between 0.5 meters per second and 1.5 meters per second. In one embodiment, an area over which the gas flows within the gas flow head may be about 8 cm$^2$, and accordingly, a flow rate of gas into the gas flow head may range from about 0.5 cm$^3$/s to about 1.5 cm$^3$/s. In some embodiments a flow rate of the return gas out of the gas flow head may range from about 0.5 to about 3 times the flow rate of supply gas into the gas flow head. However, it should be understood that other flow velocities, gas flow areas, and/or flow rates of supply gas and/or return gas may be suitable, as the current disclosure is not limited in this regard.

Figure 4:
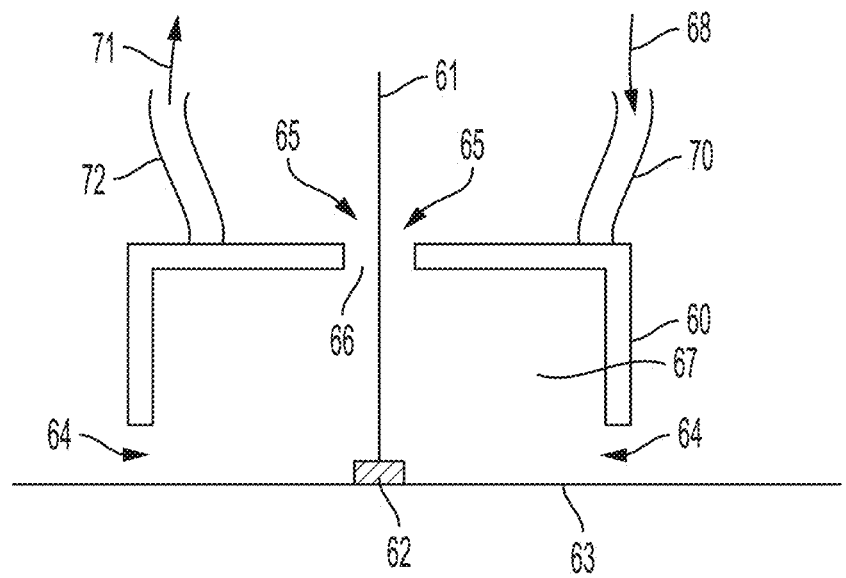
FIG. 4 is a schematic representation of a gas flow head arranged to produce a scavenge flow into the gas flow head, according to one embodiment.

FIG. 4 depicts another embodiment of an additive manufacturing system in which a laser beam 61 passes through an aperture 66 of a gas flow head 60 to form a melt pool 62 on a powder bed surface 63. The gas flow head 60 includes a larger return gas flow 71 through a gas outflow 72 than supply gas flow 68 through gas inflow 70. This differential flow induces a flow of scavenge gas into the enclosed volume 67 from the external powder bed volume. This scavenging flow may be pulled into the gas flow head through a perimeter scavenge flow 64 and an aperture scavenge flow 65. The ratio of the two scavenge flows may be determined by the area of the perimeter and the area of the aperture 66. This scavenge flow may aid in ensuring that ejected particles and fumes remain within the gas flow head and cannot propagate to the external powder bed volume. In one embodiment, the supply gas flow can be set to zero and all the return gas will be made up from perimeter and aperture scavenge flows.

Figure 5:
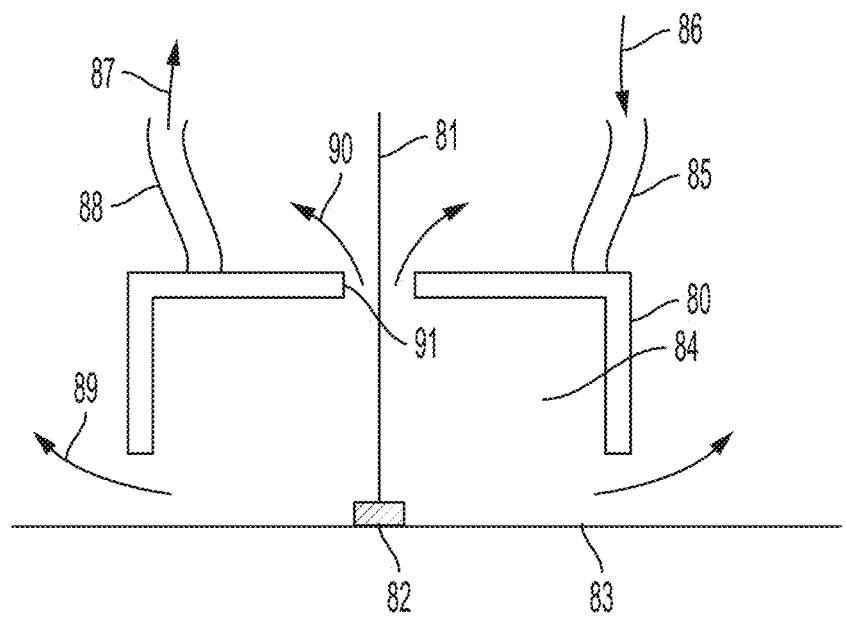
FIG. 5 is a schematic representation of a gas flow head arranged to produce an exhaust flow out of the gas flow head, according to one embodiment.

In another embodiment depicted in FIG. 5, a laser beam 81 passes through an aperture 91 of a gas flow head 80 to form a melt pool 82 on the powder bed surface 83. In this embodiment, the supply gas flow 86 through the gas inflow 85 may be set to be greater than the return gas flow 87 through the gas outflow 88, which may produce a perimeter exhaust gas flow 89 and aperture exhaust gas flow 90 out of the enclosure volume 84. This may be beneficial where additional convective cooling is required for stable operating conditions.

Figure 6:
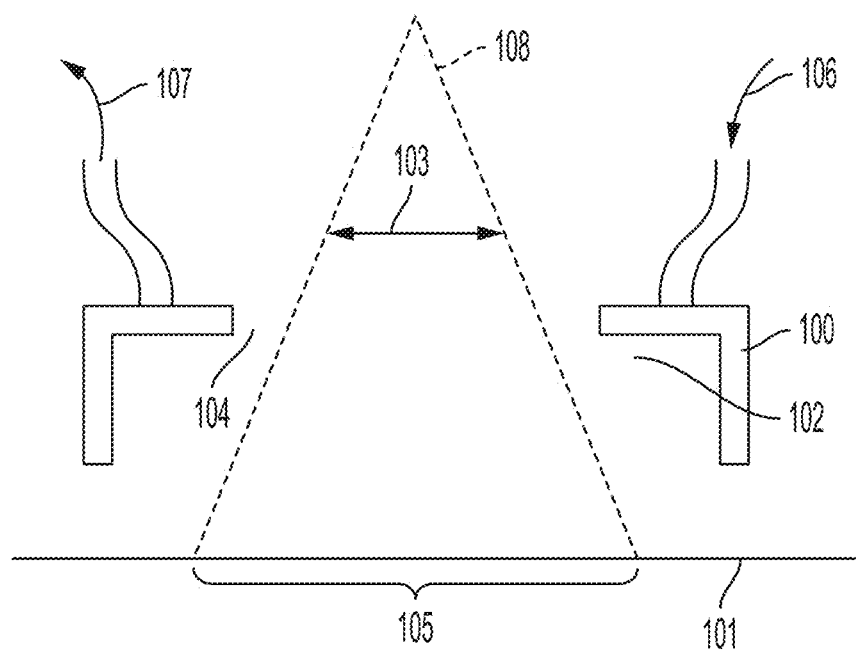
FIG. 6 is a schematic representation of a gas flow head, according to one embodiment.

In some embodiments, it may be desirable for the aperture on the top of the gas flow head to be kept as small as possible to keep the enclosed gas volume within the gas flow head as contained as possible. In situations where the scanning motion of the laser beam is at least partially generated using a scanning galvanometer mounted mirror assembly, the aperture can be opened up to allow full passage of the scanned laser beam. One such embodiment is depicted in FIG. 6. The gas flow head 100 has an aperture 104 that is large enough such that as the incident laser beam 108 is scanned over a scan angle 103 generated by a galvanometer (not depicted), the beam is allowed to pass through the gas head and illuminate an area 105 on the powder bed surface 101. The volumes of the supply gas flow 106 and return gas flow 107 may be adjusted to accommodate scavenge flow through this larger aperture. The shape of this enlarged aperture to accommodate galvanometer scanning of the incident laser beam may depend on the type of scanning.

Figure 7:
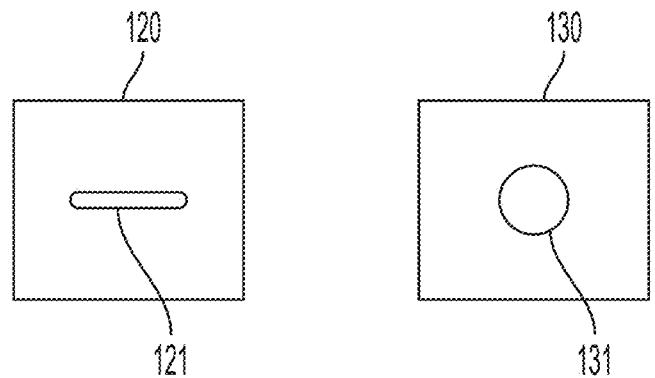
FIG. 7 depicts top views of gas flow heads with two possible aperture shapes.

FIG. 7 depicts top views of gas heads 120, 130 with two possible aperture shapes, according to some embodiments. For a galvanometer scanning strategy in a single direction, the gas flow head 120 has a long thin slot 121 to accommodate the range of motion of the incident laser beam. For galvanometer scanning in two directions, the required aperture in the gas flow head 130 may be a round hole 131.

Depending on the embodiment, the position and shape of the gas flow head can be adjusted to produce different flow profiles around the perimeter. As noted above, if the supply and return gas flow are matched, then there is no net perimeter scavenge or exhaust flow. There may still be an induced flow through the perimeter gap around the gas head as the optics unit and gas head are scanned over the entire powder bed surface. If the supply and return gas flows are not matched, the shape, magnitude, and/or direction of this perimeter flow will depend on the ratio of the supply and return flow, the length of the perimeter of the gas head, the scanning velocity of the optics unit and the height and width of the perimeter gap.

Figure 8:
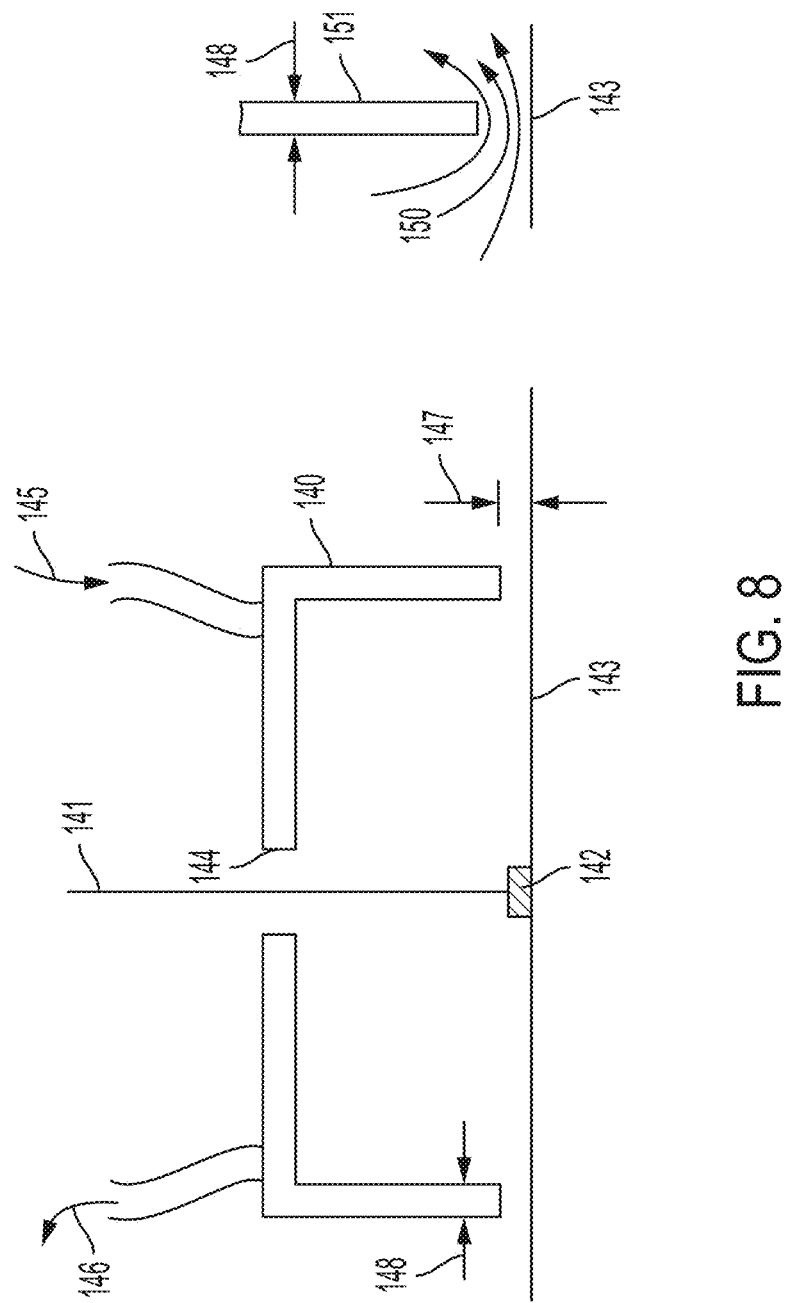
FIG. 8 is a schematic representation of a gas flow head, according to one embodiment.

FIG. 8 depicts one embodiment including a gas flow head 140 including an aperture 144 through which a laser beam 141 passes to form a melt pool 142 on a powder bed surface 143. In the depicted embodiment, the gas flow head includes a small height 147 perimeter gap and a thin perimeter width 148 between the gas flow head and the build surface. If there is a net perimeter scavenge flow 150 due to a larger return flow 146 than supply flow 145, then the small gap between the powder bed surface 143 and gas flow head side wall 151 may produce a high velocity gradient. Similarly, if there is a net perimeter exhaust flow due to a higher supply flow than return flow, the exit flow under the gas high side wall may produce a high velocity gradient. A high scanning velocity of the optics unit may serve to increase this velocity profile on one side of the gas flow head and decrease the velocity profile on the other side of the gas head. This may aid in avoiding a high velocity profile at the gas flow head perimeter that may increase the possibility of deforming or disturbing the powder bed surface. Depending on the particular embodiment, values for acceptable gap size, optic unit velocities, gas velocity profiles and scavenge/exhaust flow may depend on type of powder employed in a particular additive manufacturing process. For instance, large powder diameters with higher density materials such as steel may allow for larger velocity gradients and smaller gaps compared to lower density materials such as aluminum or small particle powder diameters. In some embodiments, using substantially balanced supply and return gas flows may also help to reduce the velocity gradients under the gas head perimeter gap.

Figure 9:
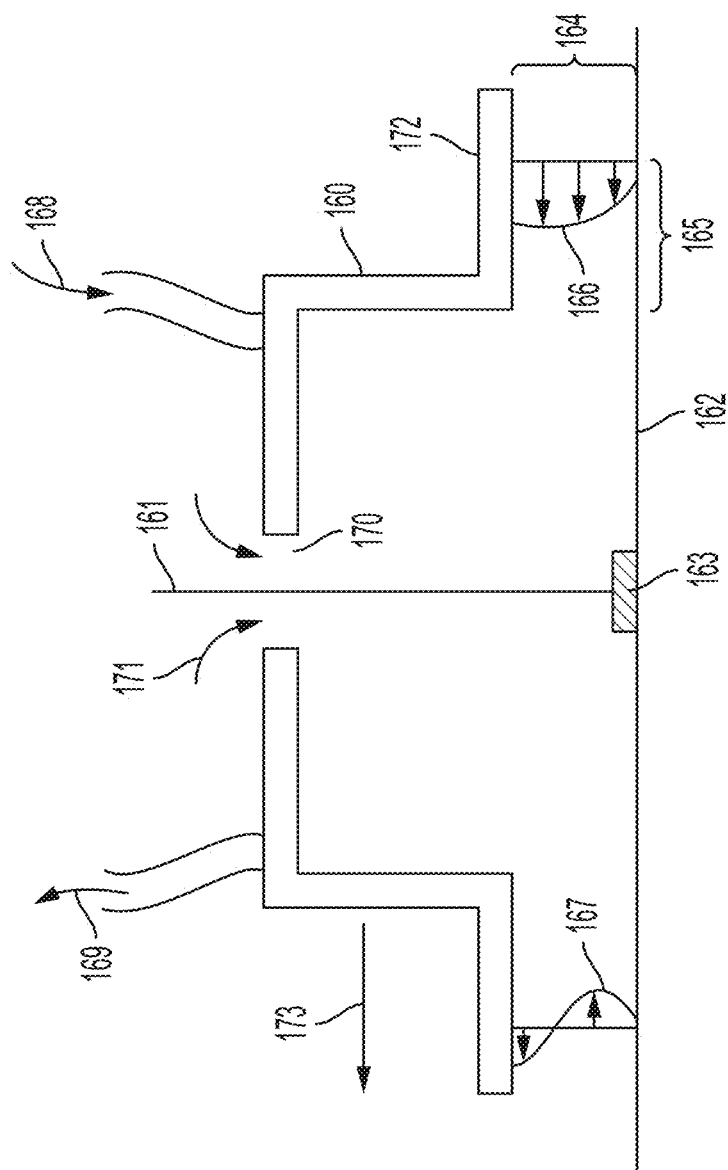
FIG. 9 is a schematic representation of gas velocity profiles in a gas flow head, according to one embodiment.

Referring now to FIG. 9, an embodiment is depicted including a gas flow head 160 including an aperture 170 through which a laser beam 161 passes to form a melt pool 163 on the powder bed surface 162. In this embodiment, the gas flow head includes a wide lip 172 around the perimeter. This wide perimeter can be used to control the velocity profile in a gap 164 between a bottom surface of the gas flow head and the build surface. With the optics units scanning along direction 173, a net scavenge flow into the gas flow head can be established by setting a higher return gas flow 169 than supply gas flow 168. The gas velocity profiles under the gap may depend on the location around the perimeter. On the leading gap, the velocity profile 167 may invert due to a boundary layer requirement of zero relative velocity at the solid surfaces. The gas at the powder surface will have zero velocity and the gas at the gas flow head gap will have zero relative velocity compared to the gas head motion. This may create a flow profile that changes direction over the width of the gap. For example, the gas velocity profile on the trailing edge 166 of the gas flow head may have a different shape as gas velocities on the leading edge 167. The length of the gap and height of the gap can both be adjusted to maintain suitable gas velocity gradients over the entire gas head perimeter. In some embodiments, the gap height and length may or may not be uniform around the gas head perimeter.

Figure 10:
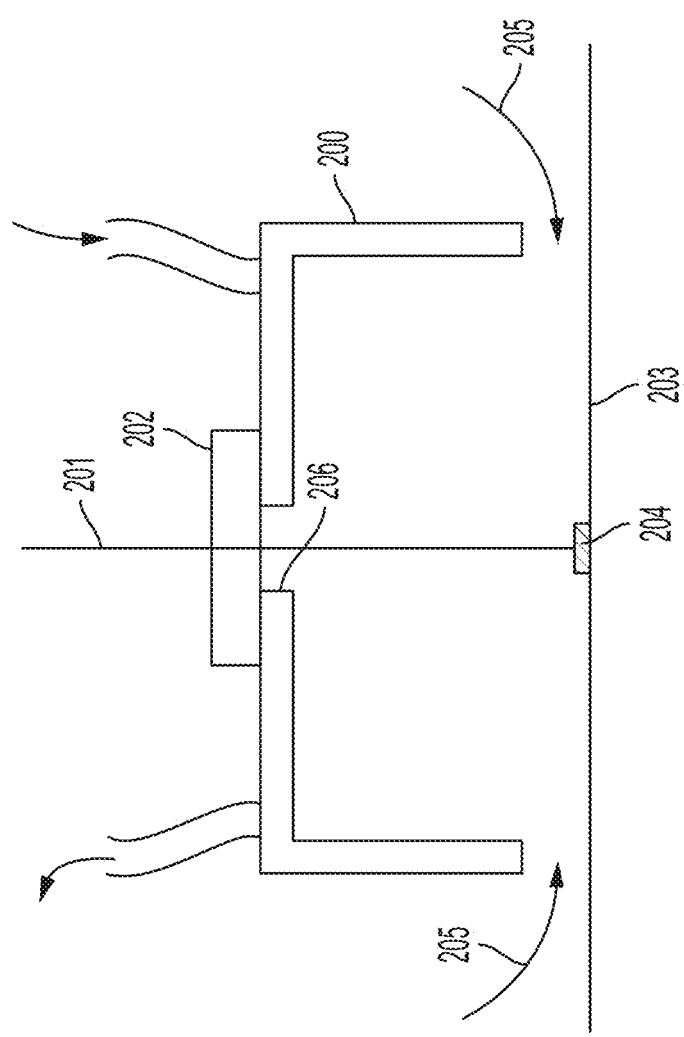
FIG. 10 is a schematic representation of a gas flow head including a window over an aperture, according to one embodiment.

In certain embodiments, the aperture in the gas flow head can be an open hole of a sufficient shape to transmit incident laser energy (e.g., one or more laser beams) through the aperture for all scanning positions from the optics unit. Alternatively, the aperture window can be covered by an optical component as shown in FIG. 10. In this embodiment, a laser beam 201 passes through an optical cover such as a window 202 over the aperture 206 of the gas flow head 200 to form a melt pool 204 on the powder bed surface 203. Such an arrangement may reduce and/or eliminate scavenge gas flow 205 or exhaust gas flow through the aperture. The optical cover can be selected to minimize reflection and/or absorption of the incident laser and can further protect upstream optical components from ejected particles.

Figure 11:
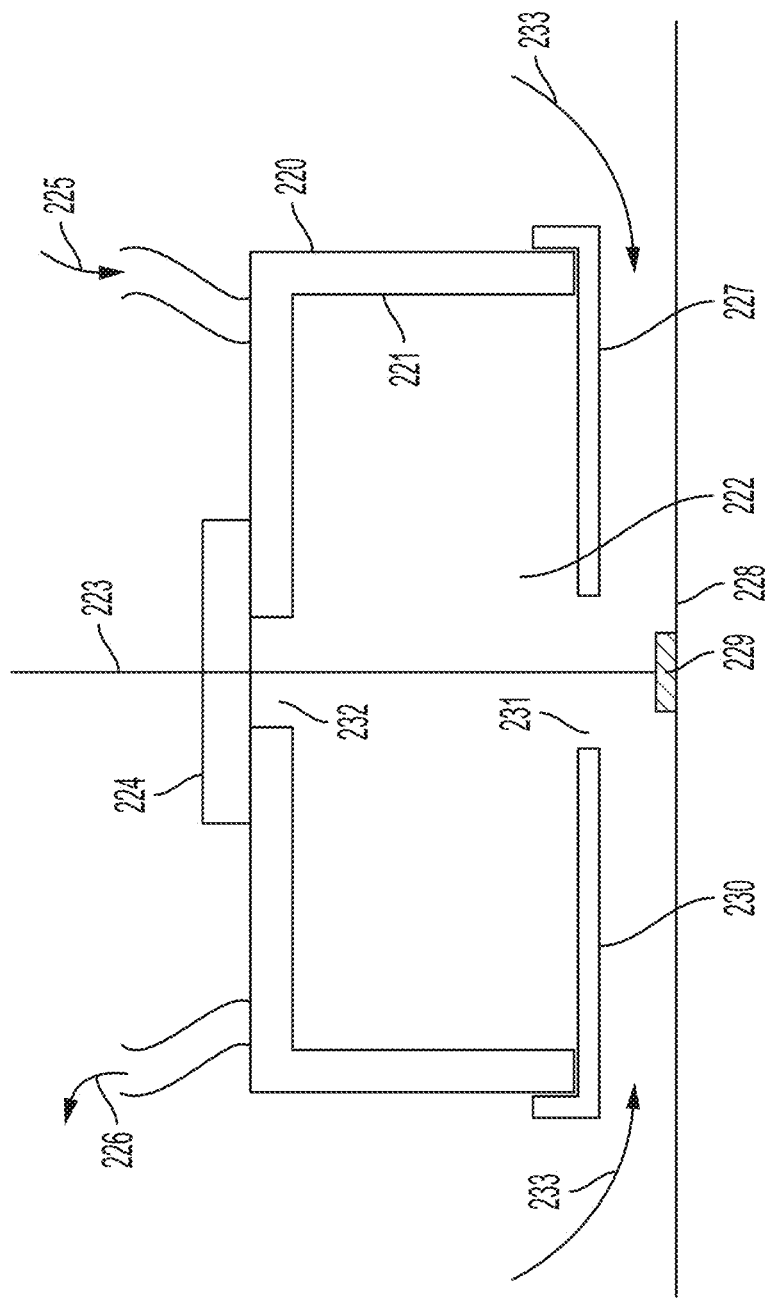
FIG. 11 is a schematic representation of a gas flow head including a mask, according to one embodiment.

In some embodiments, a gas flow head may be masked along at least a portion of a lower surface adjacent a build surface. Such arrangements may aid in isolating some or most of the gas velocity profile inside the gas flow head from the powder surface except in a small area around the melt pool. For example, FIG. 11 depicts an embodiment in which a laser 223 passes through a gas head 220 to form a melt pool 229 on a powder bed surface 228. A mask 227 is provided on the bottom of the gas flow head 220. This mask may be fastened to downwardly extending portions 221 of the gas flow head 220 and may seal the gas flow head to provide an at least partially enclosed volume 222 within the gas flow head. In this manner, the gas flow head may define a covered volume 230 between the mask and the powder bed surface 228. The mask may include an open aperture 231 that allows gas exchange between the enclosed volume and the covered volume. The upper aperture on the gas head 232 may be covered with an optical window 224, or it may remain open. The upper and mask apertures may be aligned to allow the incident laser beam 223 to propagate to the powder surface and generate a melt pool 229. In some instances, setting a higher return flow 226 from the gas flow head relative to the supply flow 225 may provide a net scavenge gas flow 233 into the gas flow head from the external build volume. If an optical window is arranged to seal the upper aperture, this entire scavenge gas flow will have to pass through the mask aperture. If the upper aperture is left open, the scavenge flow may be shared between the mask aperture and upper aperture.

In some embodiments, the height of a gap between a bottom surface of a gas flow head and a powder bed (e.g., the height of a perimeter gap or the space between a bottom mask or lip of the gas flow head and the powder bed) may range from about 5 mm to about 40 mm (e.g., about 5-20 mm). Moreover, as noted above, it may be desirable to minimize the size of the aperture(s) in a gas flow head, for example, to minimize flow of gas out of the aperture(s). In some embodiments, the size of the aperture(s) may be selected to be only slightly larger than the maximum beam width of the laser beam that passes through the gas flow head. For instance, an upper aperture may be about 2-3 mm larger than the maximum beam dimension in any direction, and a lower aperture (if included), may be about 5-10 mm wider than the widest possible beam width. Alternatively or additionally, in some embodiments, the size of the aperture(s) may be selected such that the aperture(s) are substantially smaller than the overall size of the gas head. For example, the open area of an aperture may be between 0.05 to about 0.5 times a projected area of the gas head on the powder bed surface.

In some embodiments, the size of the upper aperture and mask aperture may be very different. The upper aperture may only have to be large enough to allow an incident laser beam to pass through while maintaining a very small upper aperture area. For example, if the incident laser beam has an area of 0.1 mm×0.1 mm, the upper aperture may have dimensions of 2 mm×2 mm. In another example, an incident laser beam may have a line-shaped profile with an area of the beam profile of 0.1 mm×10 mm, and the upper aperture may be 2 mm×14 mm.

In some embodiments, the laser beam may be scanned using a galvanometer, and the upper aperture size in the direction of the scanning motion can be increased to allow full passage of the scanned laser profile. In some such embodiments, the mask aperture is larger than the upper aperture to provide a space for scavenge gas flow as well as to provide a window to allow ejected particles and fumes from the melt pool at the powder surface to enter into the enclosed volume of the gas head and be entrained by the gas flow profile for entrapment. For example, if the incident laser beam has an area of 0.1 mm×0.1 mm, the mask aperture may have a dimension of 4 mm×10 mm. The longer dimension of the mask aperture is in the direction of the motion of the scanned laser. In some embodiments, both width and length dimensions of the mask apertures may be orders of magnitude greater than the incident laser beam profile size, but still less than the size of the gas head mask surface. The width and length of the mask aperture may be 100 to 10000 times the width and length of the laser beam profile while still being only 0.05 to 0.5 times the length and width dimensions of the mask surface. In turn, the size of the mask surface (which may correspond to a projected area of the gas head on the powder surface) may by 0.05 times to 0.12 times the size of the entire powder bed surface. Thus, it should be understood that a gas head may be substantially smaller than the powder bed area in some embodiments.

As the scanning speed of the optics head increases, the mask aperture length in the direction of motion may also be increased to accommodate the higher relative velocities between the powder bed surface and the gas head assembly.

The position of the mask aperture relative to the laser beam profile may also be shifted to accommodate higher scanning velocities. For a system where the optics head is scanned in both directions or at slower speed, the laser beam may be centered in the mask aperture. For example, a optics head with a beam profile of 0.1 mm long×10 mm wide that scans at a forward and reverse velocity of 200 mm/sec, may have a mask aperture of 20 mm long×14 mm wide with the beam centered in the middle of the mask aperture. For a system where the optics head is scanned predominantly in one direction at high speed, the length of the mask aperture in the direction of motion may be lengthened and the laser beam profile is shifted towards one side of the gas aperture. For example, an optics head with a beam profile of 0.1 mm long×10 mm wide that scans at a forward velocity of 600 mm/sec, may have a mask aperture of 40 mm long×14 mm wide with the beam shifted to be within 10 mm of the leading edge of the mask aperture. The direction of the gas flow from the supply port to the return port may also be selected to match the predominant scan direction for high speed scanning situations. This will reduce induced turbulence with the gas head enclosed and covered volumes as the shear velocities within the overall gas flow will be reduced. For cases with multi-direction scanning, the gas flow from the supply port to the return port can be configured to establish predominant flow orthogonal to the optics box motion. This prevents producing a counter flow situation when the scanned motion is opposite to the predominant gas flow.

Figure 12:
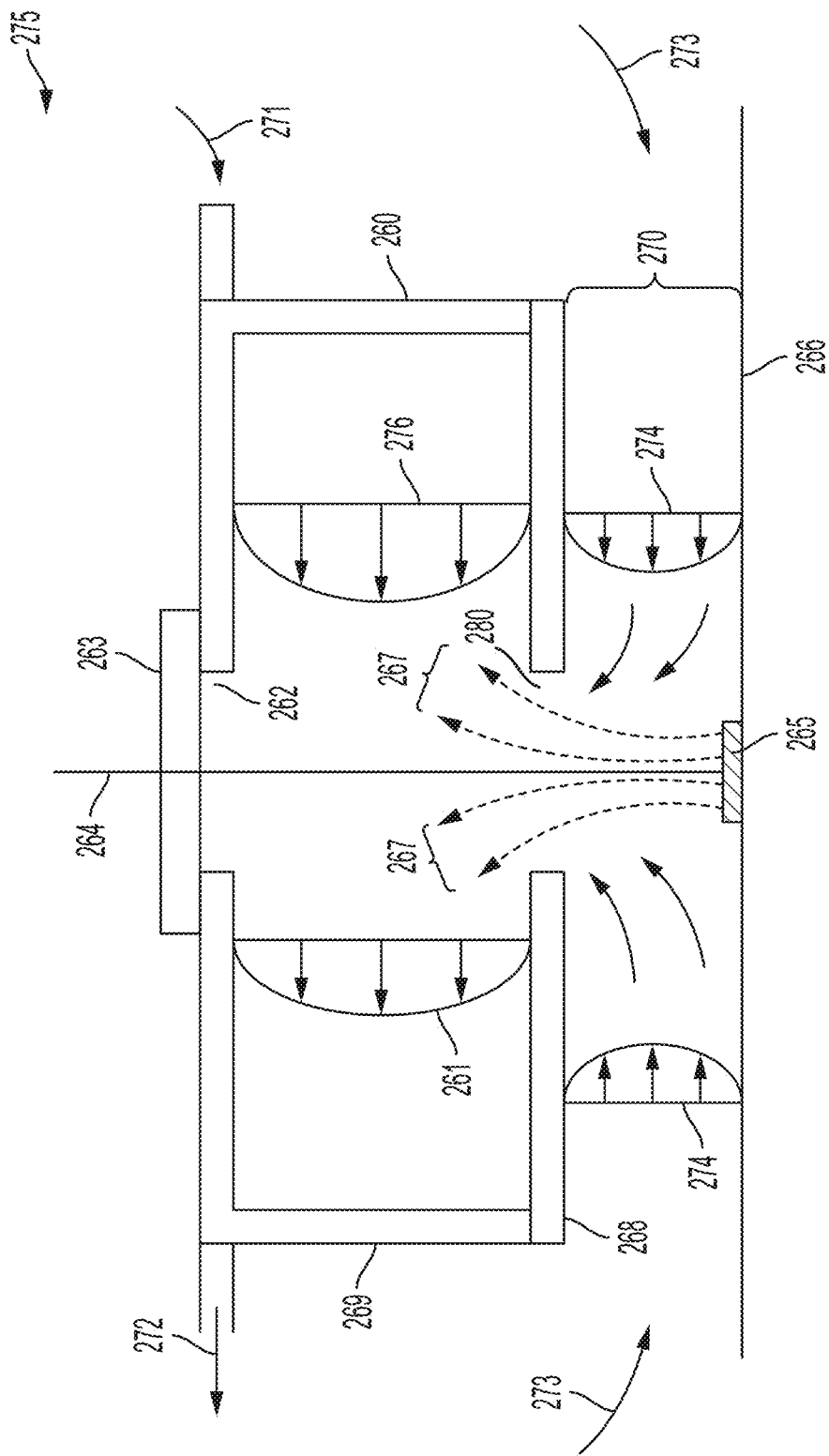
FIG. 12 is a schematic representation of gas velocity profiles in a gas flow head including a mask, according to one embodiment.

FIG. 12 depicts potential gas velocity profiles for one embodiment of a gas flow head 260 when the gas head is not in motion over the powder bed surface 266. In the depicted embodiment, the gas flow head includes a mask 268 attached to a downwardly extending portion 269 of the gas flow head; the mask has an opening defining a lower aperture 280. The gas flow head further includes an upper aperture 262 covered by a window 263, and a laser beam 264 passes through the apertures of the gas flow head to form the melt pool 265. By providing a higher return flow 272 relative to the supply flow 271, a net inflow scavenge flow 273 may be produced that has to travel through the gap 270 between the mask and the powder bed surface. The scavenge gas velocity profile 274 may depend on the gap height and scavenge gas volumetric flow. A small net positive scavenge inflow may aid in preventing fumes from propagating from the melt pool area 265 into the external build volume 275. The net inflow scavenge gas may also help to entrain ejected particles 267 and pull them up into the internal velocity profile 276 inside the gas flow head volume. The velocity profile inside the gas flow head may be independent of the scavenge gas velocity profile in the gap between the mask and powder bed surface. According to some aspects, the velocity profile and velocity gradients in the gas head can be increased to much higher levels without risking deformation of the powder bed surface than for a gas head with an open bottom. For instance, only when velocities across the mask aperture start to induce instabilities in the scavenge flow does the gas flow inside the gas head have to be limited. Such high velocity gradients in the internal gas flow head velocity profiles may help to entrain the fumes and ejected particles from the melt pool, and even very heavy and large ejected particles will be entrained and trapped into the gas head. This may prevent them from contacting the powder bed surface and causing subsequent processing problems.

Figure 13:
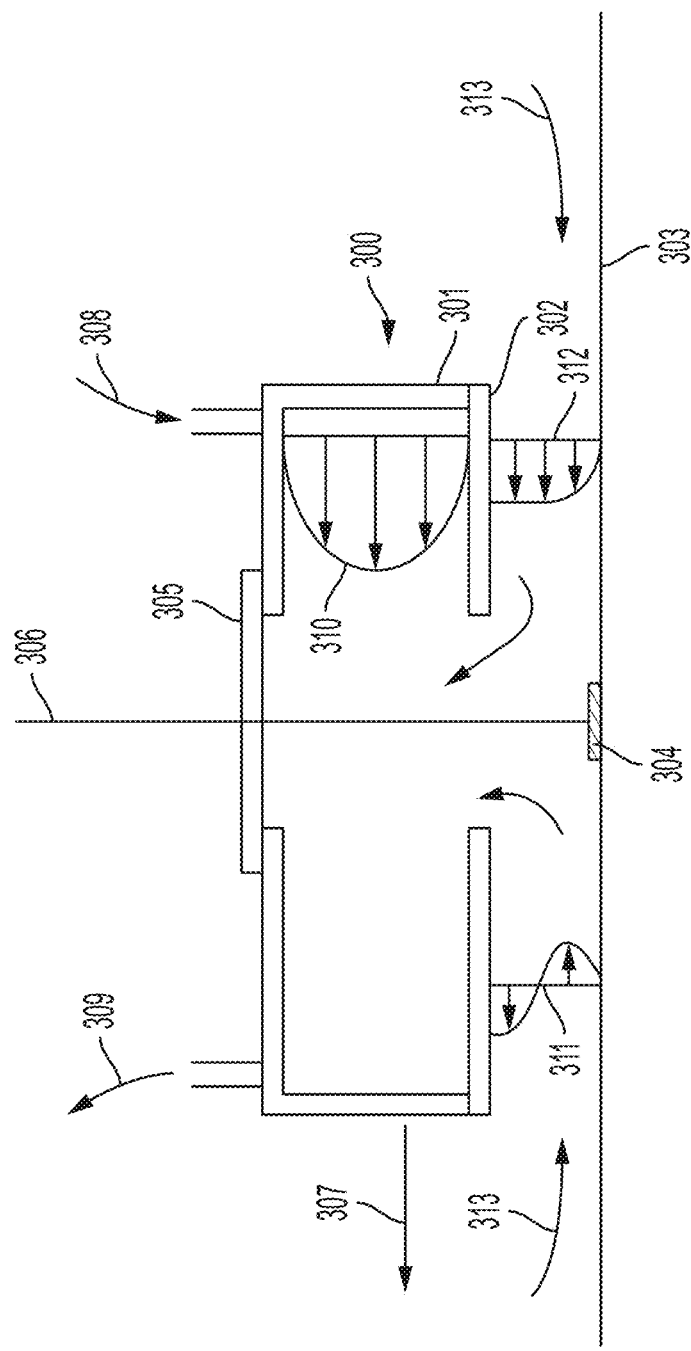
FIG. 13 is a schematic representation of gas velocity profiles in a gas flow head during movement of the gas flow head relative to a powder bed, according to one embodiment.

FIG. 13 shows another embodiment of a gas flow head 300 in a configuration in which the gas flow head is in motion along direction 307 across the powder bed surface 303. In the depicted embodiment, a laser beam 306 passes through a window 305 and through the gas flow head to form a melt pool 304 on the powder bed surface 303. A net inflow scavenge flow 313 may be produced by adjusting for a higher return flow 309 relative to the supply flow 308. A high velocity profile 310 inside the gas head can be generated by providing a high supply flow. The gas velocity profile 311 between the mask 302 and powder bed surface on the leading edge may show an inverted profile due to the motion of the gas head relative to the powder bed surface. The gas velocity profile 312 between the mask and the powder bed surface on the trailing edge may show a non-inverted profile. With a sufficient net scavenge flow, any fumes and ejected particles from the melt pool 304 may be entrained and captured by the gas flow head. The size of the mask aperture and the height of the mask above the powder bed surface can both be adjusted to optimize particle and fume entrainment for a given material and set of scanning conditions. For very heavy powders (e.g., high material density) that are more resistant to disturbance from higher gas velocities, a smaller gap between the mask and powder bed surface with a higher net scavenge flow may be possible. For lighter powders (e.g., low material density), a larger mask to powder bed surface with lower net scavenge flow may be required to reduce deformation of the powder surface under the gas head assembly. In some embodiments, the mask aperture may be non-symmetric around the melt pool with a larger edge offset on the trailing edge than the leading edge to increase the entrainment of the ejected particles and fumes. Moreover, the mask aperture may be placed offset relative to the gas flow head centerline to increase scavenge flow on one side and reduce it on the other. A longer offset between the gas flow head edge and the aperture may result in reduced scavenge flow in that area while a shorter offset from gas head edge may result in higher scavenge flow in that area. In this manner, high velocity gradients in the gas flow head may ensure entrainment of all fumes and ejected particles while reducing the velocity profiles and gradients experienced by the powder bed surface.

Figure 14:
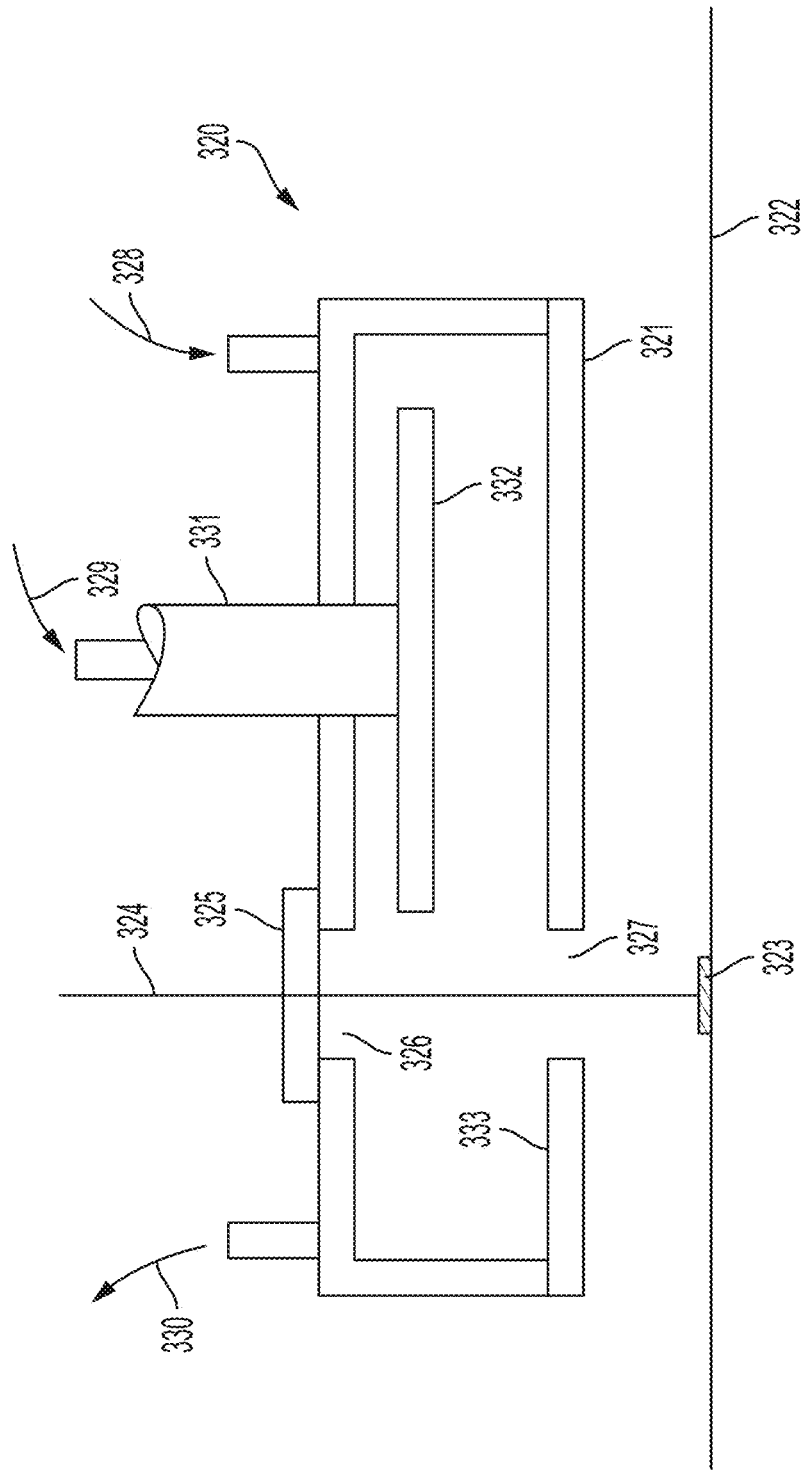
FIG. 14 is schematic representation a gas flow head including a gas velocity generator, according to one embodiment.

In some instances, producing very high velocity gradients within a gas flow head using a high supply volume requires a large volumetric gas flow. This high gas flow may require large fans or blowers, large supply and return piping and/or more energy to operate. Referring now to FIG. 14, one embodiment of an additive manufacturing system that may produce high velocity gradients within a gas flow head while reducing total volumetric gas flows is described in more detail. The gas flow head 320 includes a mask 321 with an open mask aperture 327 (e.g., an aperture on a lower surface of the gas flow head) and an upper aperture 325 that is covered with an optical component such as a window. In the depicted embodiment, the gas flow head includes gas velocity generator formed as a disc 332 mounted on a drive shaft 331 in the enclosed volume 333 of the gas flow head. The disc can be rotated within the gas flow head and the edge of the disc is positioned so as to not interfere with transmission of the laser beam 324 through the gas flow head to form the melt pool 323 on the powder bed surface 322. The supply gas can be ported through a normal supply feed 328 and/or through the drive shaft 329 if the shaft is hollow. Return gas flow 330 may be set independently from the total supply volume to establish any desired scavenge or exhaust flow. The disc can be spun at any suitable speed to provide a desired gas velocity within the gas flow head. As the rotational speed of the disc increases, the gas in the gas flow head may be entrained according to the rotating disc motion. This entrainment may produce a gas velocity profile tangential to the gas around the disc (above and below) as well as to the gas around the outer edges of the disc. This entrained tangential velocity around the edge of the disc may produce a high velocity gradient over the mask aperture, which will help to entrain ejected particles and fumes from the melt pool 323. The net effective gas velocity over the mask aperture may be set by the disc rotational speed and the volumetric flow of the supply and return gas.

Figure 15:
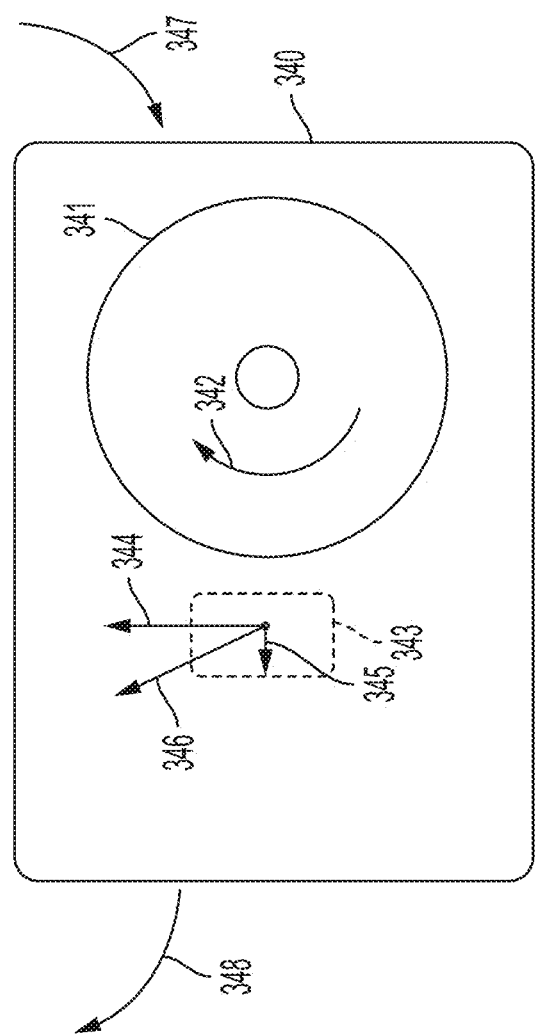
FIG. 15 is a top view of one embodiment of a gas flow head including a gas velocity generator.

FIG. 15 depicts a top view of a gas head 340 with a rotating disc 341 and aperture 343. The rotational motion 342 of the disc entrains the gas with a tangential velocity profile 344 in the aperture space. The volumetric supply flow 347 and return flow 348 along with the cross sectional area of the gas flow head may define an average bulk velocity profile 345 across the aperture space. The tangential and bulk velocity terms may be used to define a net effective gas velocity profile 346 across the aperture space. Even with low bulk velocities and small volumetric supply and return gas flow rates, the spinning disc can generate a high velocity profile and high gradients across the aperture space to enable entrainment of ejected particles and fumes.

Figure 16:
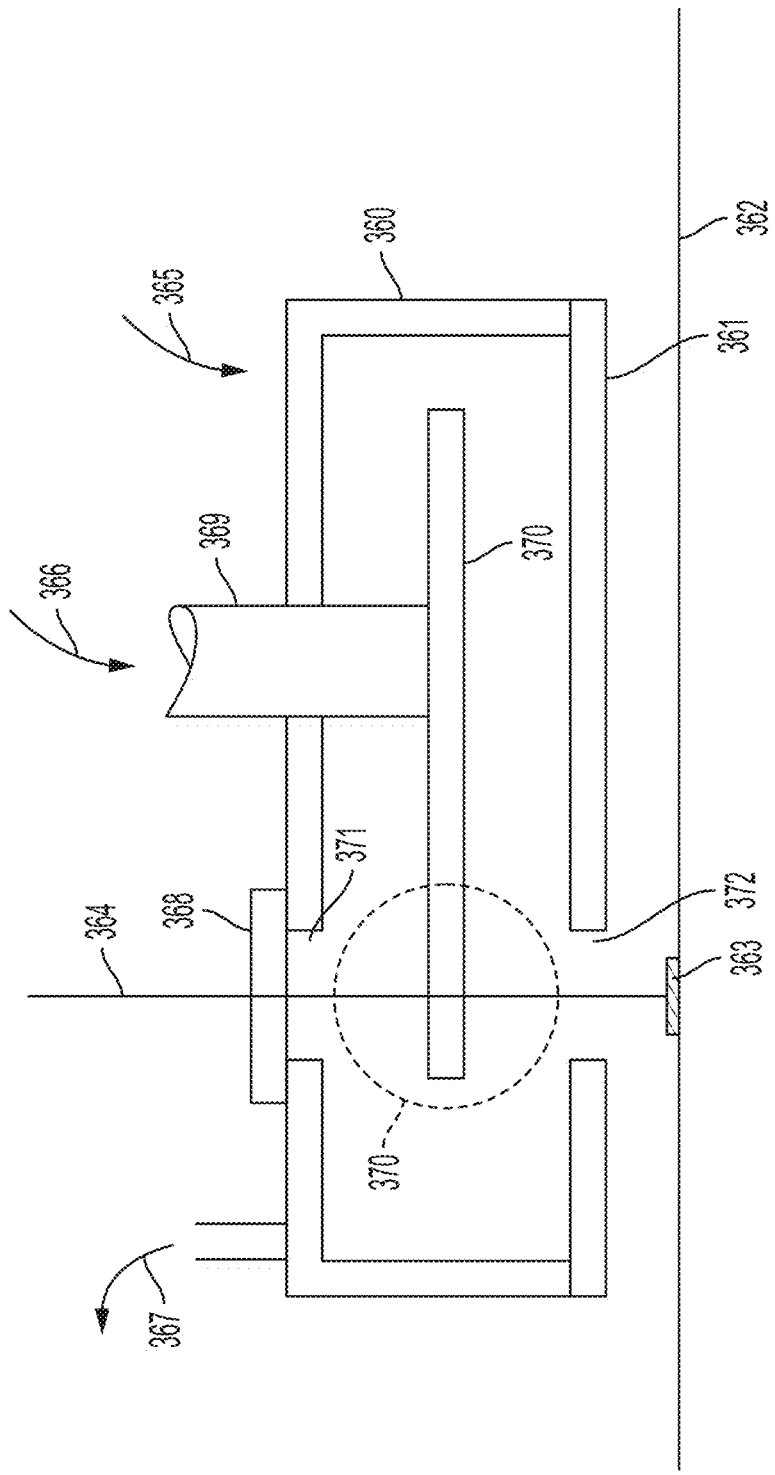
FIG. 16 is a schematic representation a gas flow head including a gas velocity generator, according to one embodiment.

As shown in FIG. 16, a gas head 360 may include a spinning disc 370 that is made of a material that is configured to transmit an incident laser beam 364. In this embodiment, the disc extends into a space 370 between the upper aperture 371 and the lower mask aperture 372 on the mask 361, and the incident laser beam 364 passes through the spinning disc to form the melt pool 363 on the powder bed 362. This may add an additional level of protection between the optical component 368 covering the upper aperture and the melt pool 363. The velocity gradients close to the disc may be very high and may significantly reduce any risk of an ejected particle from contacting the spinning disc. This may aid in keeping the spinning disc clean and free of contaminants and may further provide a natural convective cooling of the spinning disc. Even with very highly transmissive optical components, there may be some absorption of the transmitted laser energy, and with high incident laser energy levels, optical components may overheat. Spinning the disc can help cool the disc and prevent localized overheating. Use of a transmissive spinning disc also may allow the elimination of optical components that cover the upper aperture while still maintaining a solid protection barrier between the melt pool and the upstream optical components in the optics unit. In the depicted embodiment, the disc 370 is rotatable about an axle 369, and similar to the embodiments discussed above, the gas flow head 360 includes a gas inflow 365 and a gas outflow 367.

Figure 17:
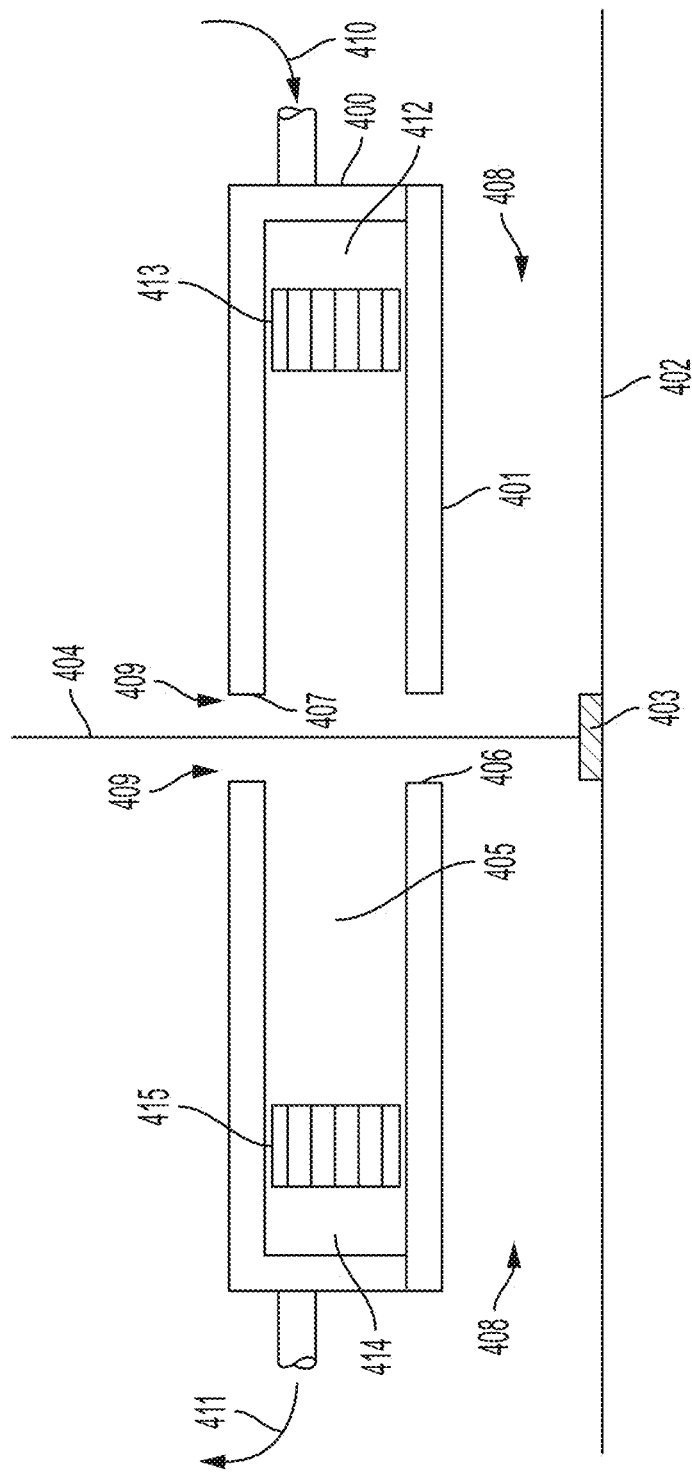
FIG. 17 is a schematic representation of a gas flow head including flow guides, according to one embodiment.

FIG. 17 depicts another embodiment including a gas flow head 400 with a mask 401 and aligned upper and mask apertures 407 and 406, respectively, that both may remain open to permit transmission of the laser beam 404 to form a melt pool 403 on the powder bed 402. In the depicted embodiment, the volume within the gas flow head is broken into three different volumes. Specifically, a bulk cross flow volume 405 is provided between the two apertures and has a cross-flow components and also a net scavenge flow from the lower aperture 408 and upper aperture 409. The supply flow 410 is fed into a volume 412 that is connected to the bulk cross flow volume by a flow guides such as flow straightening/flow directing structure 413. This flow structure can take on any suitable form such as a honeycomb array, aligned tube array, porous structure of combinations thereof. This flow structure may serve to distribute the supply flow into a uniform cross flow structure within the bulk cross flow volume. This may help to reduce the degree of turbulence in the bulk cross flow and aid in making the entrainment of the scavenge flows more predictable. There may also be a flow guide 415 for the return flow and a separate return flow volume 414 after the return flow structure. This can also serve to make the velocity profile within the bulk cross flow volume more uniform. The shape, design and layout of the flow structures may depend on the shape of the gas flow head, masks, apertures and/or volume of flow.

FIG. 17 also depicts an embodiment suitable for handling powder bed material that may produce significant fumes. Due to the very small particle size and high surface area of fume content, even with high velocity gradients, some of the particles may deposit on all surfaces, including moving surfaces such as the surfaces on spinning disks. For this reason, it may be advantageous to keep both apertures open and allow scavenge gas to flow through both apertures by setting a higher return flow than supply flow. With the apertures open, the fumes may not have any optical components to deposit onto and the laser beam(s) may see an unobstructed path between the optics unit and powder bed surface. The gas flow head and mask may be made sufficiently large with enough gas flow to ensure a substantial portion of the fumes and/or ejected particle are captured by the gas flow head. This may prevent the fumes from depositing on the internal structures within the additive manufacturing systems, or on other optical components. The return gas flow can be passed through one or more filters to aid in removing the fumes and/or entrained particles before being returned to the systems.

In addition to the above, another advantage associated with the use of a gas flow head with controlled supply, return and scavenge flows is that consistent local convective heat transfer can be produced around the melt pool region. With large powder bed surfaces that have a non-uniform flow over their area, the convective thermal characteristics at different areas of the build surface may be different. Areas with greater gas flow and higher velocity gradients may have a higher coefficient of convection than areas with less gas flow and lower velocity gradients. If the gas flowing over the powder bed surface is cooler than the powder bed surface, which may occur in areas after solidification of the melt pool, this net convective heat transfer serves to cool the build surface. If the gas flows are different over the build surface, then some areas may cool more rapidly than other areas. Different rates of cooling at different points on a three-dimensional printed part can induce differential thermal stresses that can cause deformation of the final part. In some cases, if the convective cooling over different areas of the build surface is sufficiently different, then some areas of the build surface may not be suitable for selective laser melting at all and the effective size of the build surface has to be reduced.

The entrained particles that are captured by the gas flow head may cover a wide range of sizes from very small fine particles that are easily entrained by a flowing gas up to particles that are many times the size of the characteristic powder bed material size. These larger, heavier particles may be entrained and captured by the gas head, but may be too heavy to be carried in the return gas flow to filter units. These larger, heavier particles may end up trapped in the enclosed gas head volumes in systems that use a mask on the bottom of the gas head. A small drain trap can be added to the mask surface, and when a sufficient quantity of larger particles have accumulated in the enclosed gas head volume, the gas head can be positioned outside the build volume surface and the drain trap can be opened to remove the larger particles from the system in a way that does not affect the powder bed surface.

According to some aspects, the use of a gas flow head with controlled supply, return, and scavenge gas flows may produce a uniform convective heat transfer condition around a melt pool region. Where laser beam(s) are scanned over the build surface, the gas flow head may produce a consistent and uniform gas velocity profile to entrain ejected particles and fumes. This gas flow and velocity profile may also produce a consistent and uniform convective heat transfer characteristic. Uniform cooling across the entire build surface may aid in producing a more uniform part and may enable full use of the entire build surface at all times.

In some embodiments, the scan direction of the optics head over the build surface may be limited to back and forth scans in one or two primary directions. For example, if in two directions, the directions may be substantially orthogonal to each other. According to some aspects, in such embodiments, a gas flow head may include one or more flow restrictors and guides to a gap between a bottom mask of the gas flow head and the build surface. As discussed above, a scavenge gas flow from the build volume into the gas flow head may used to entrain particles and fumes that are produced by the melt pool and to reduce the incidence of these particles falling back onto the build surface, and as the scavenge gas flow in the primary scan direction is increased, the efficacy of capturing these particles may be increased. The inventors have appreciated that gas flow into a mask aperture from the build volume from in front of the gas flow head and from behind the gas flow head (relative to the scan direction) is typically the most effective at capturing these particles, while flow from the side of the aperture is less effective. Accordingly, in some embodiments in which a scan direction is back and forth in a single predominant direction, a gas flow head may include baffle plates mounted with the predominant scan direction. The projected area of these baffle plates may be small in the direction of scan and the ends of the plates may be positioned close to the powder bed surface such that the plates do not produce any significant entrained gas effects or cause displacement of the powder surface. The small gap between the baffle plates and the powder bed surface may greatly reduce the scavenge gas flow from the sides of the gas flow head and may aid in ensuring that the predominant gas flow is through the front and rear of the gas head relative to the scan direction, which may provide enhanced entrainment of particles and fumes.

Figure 18:
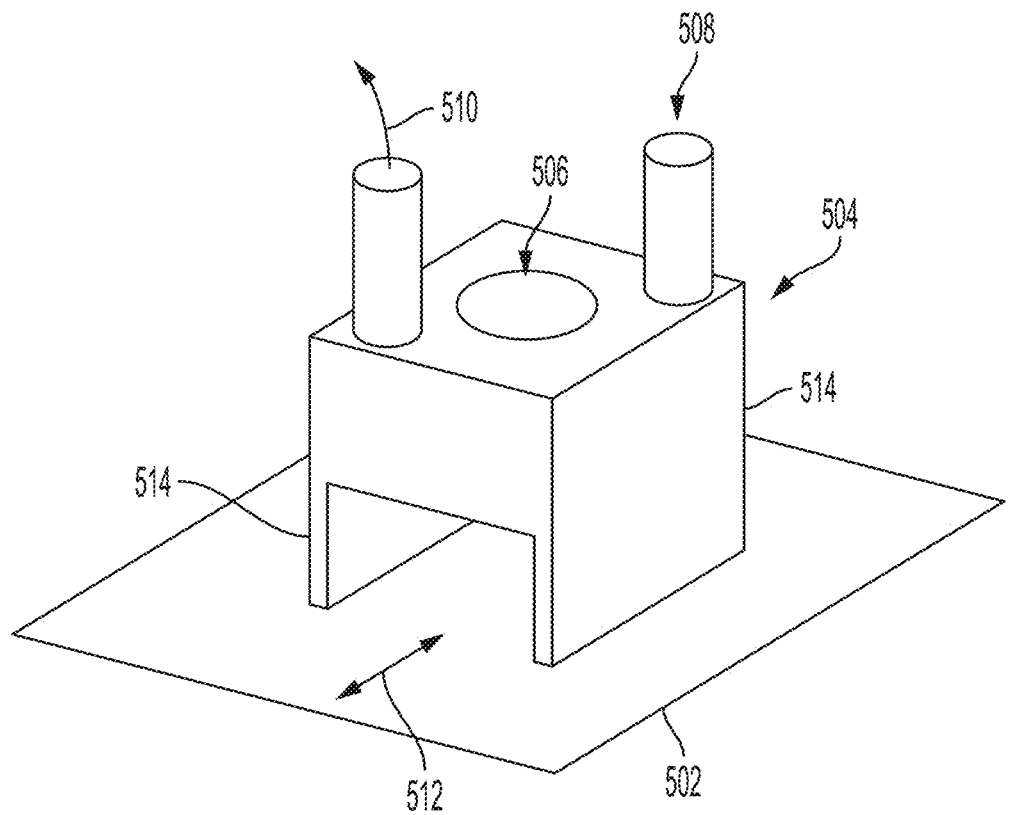
FIG. 18 is a schematic representation of a gas flow head including baffle plates, according to one embodiment.
Figure 19:
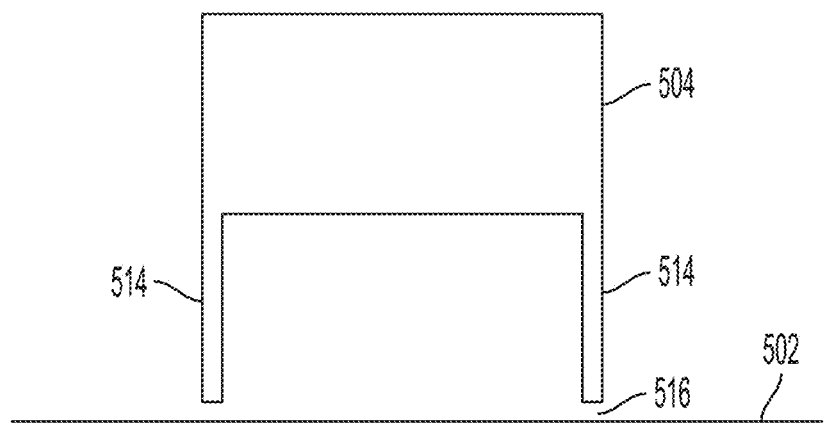
FIG. 19 is a cross-sectional side view of the gas flow head of FIG. 19.
Figure 20:
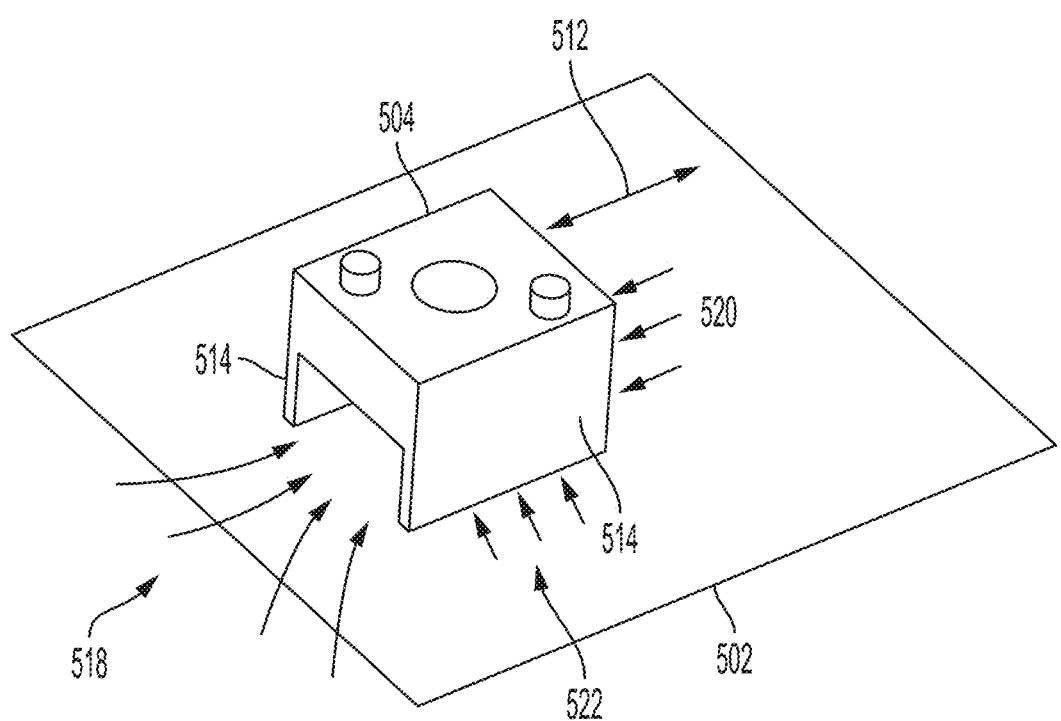
FIG. 20 is a schematic representation of the gas flow head of FIG. 19, further illustrating exemplary gas flows.

FIGS. 18-20 depict one embodiment of a gas flow head 504 moveable relative to a build surface 502. Similar to embodiments described above, the gas flow head includes an aperture 506 to permit laser energy to be transmitted through the gas flow head to the build surface, as well as a gas inlet 508 and a gas outlet 510. In the depicted embodiment, the gas flow head 504 is moveable along the build surface 502 along a primary scan direction 512. The gas flow head further includes baffle plates 514 extending downwardly towards the build surface and extending along a direction substantially parallel to the primary scan direction. FIG. 19 depicts a cross-sectional side view of the gas flow head 504 direction parallel to the primary scan direction 512. As illustrated in this figure, a small gap 516 is formed between the bottom of the baffles 514 and the build surface. FIG. 20 illustrates the gas flows that result from the inclusion to of the baffle plates 514. In particular, as the gas flow head 504 is scanned across the build surface 502 along the primary scan direction 512, gas flows 518 and 520 into the rear and front of the gas flow head, respectively, may be substantially unrestricted, while the baffle plates 514 may limit the gas flow 522 into the sides of the gas flow head.

Depending on the particular embodiment a gap between a mask plate and the build surface can be larger than the gap between the bottom of the baffle plates and the build surface. For example, the gap between the build surface and the bottom of the mask plate may be between about 5 mm and about 30 mm (e.g., about 8-15 mm). The gap between the build surface and the bottom of the baffle plates may be between about 0.2 mm and about 4 mm (e.g., about 1-3 mm). Due to the thin cross section of the baffle plates, the entrained flow around the plates and between the bottom of the baffle plates and the build surface will be kept to a minimum and even a small gap will not produce a disturbance to the powder surface.

Figure 21:
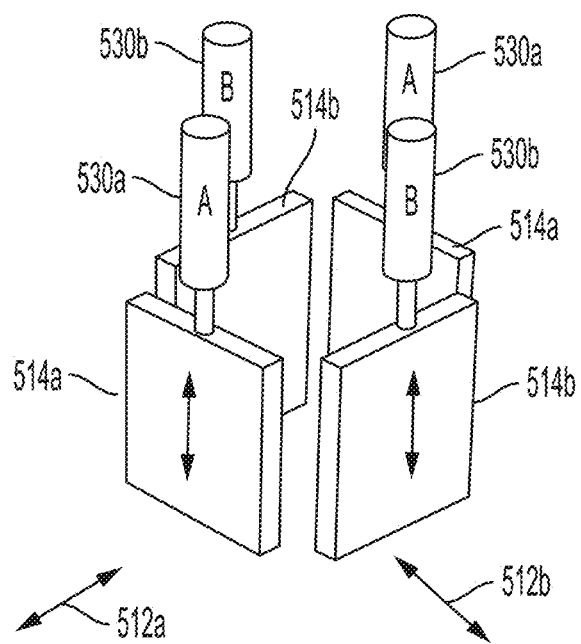
FIG. 21 is a schematic representation of actuated baffle plates, according to one embodiment.

In some embodiments, the baffle plates may be mounted on actuators such that the baffle plates may be selectively raised and lowered. For example, in embodiments in which the optics unit and gas flow head are scanned predominantly along two orthogonal scan directions, two sets of actuated baffles plates can be mounted on actuators that can raise and lower the appropriate baffles plates for a given flow direction. FIG. 21 depicts an exemplary embodiment of actuated baffle plates that may be mounted on a gas flow head to selectively control gas flow into the gas flow head along different directions when the gas flow head is scanned along different directions; for clarity, the gas flow head is not depicted in FIG. 21. The depicted embodiment includes two sets of baffle plates 514a and 514b, with each set of baffle plates being selectively movable between an extended position and a retracted position. For example, when the gas flow head is scanned along a first scan direction 512a, the first set of baffle plates 514a may be retracted (i.e., raised away from the build surface), and the second set of baffle plates 514b may be extended (i.e. lowered towards the build surface). Similarly, when the gas flow head is scanned along a second scan direction 512b, the first set of baffle plates 514a may be extended and the second set of baffle plates 514b may be retracted. As illustrated, each baffle plate 514a, 514b is coupled to an actuator 530a, 530b that may be configured to control the extension and retraction of the associated baffle plate. Depending on the particular embodiment, the actuators 530a, 530b may include pneumatic, electric, hydraulic, or any other suitable type of actuator, as the current disclosure is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An additive manufacturing system comprising:
    a build surface;
    one or more laser energy sources;
    an optics assembly movable relative to the build surface and configured to direct laser energy from the one or more laser energy sources toward the build surface, wherein exposure of a layer of material on the build surface to the laser energy melts at least a portion of the layer of material; and
    a gas flow head coupled to the optics assembly and defining a partially enclosed volume between the optics assembly and the build surface, the gas flow head comprising:
        a gas inflow through which a supply gas flows into the gas flow head during operation of the gas flow head,
        a gas outflow through which a return gas flows out of the gas flow head during operation of the gas flow head, and
        an aperture arranged to permit transmission of the laser energy through the gas flow head to the build surface, wherein the supply gas and return gas define a gas flow profile within the gas flow head during operation of the gas flow head;
    wherein a first flow rate of the supply gas into the gas flow head is less than a second flow rate of the return gas out of the gas flow head during operation of the gas flow head, and a difference between the first flow rate and the second flow rate causes a scavenge gas to flow into the gas flow head.

2. The additive manufacturing system of claim 1, wherein the gas flow head and optics assembly are configured to be moved across the build surface at substantially a same velocity.

3. The additive manufacturing system of claim 1, wherein the aperture has an area ranging from between about 10 and about 10,000 times a beam area of the one or more laser energy sources.

4. The additive manufacturing system of claim 3, wherein the gas flow head has an area ranging from between about 10 to about 100 times the area of the aperture.

5. The additive manufacturing system of claim 4, wherein the area of the gas flow head is about 0.05 to about 0.2 times an area of the build surface.

6. The additive manufacturing system of claim 1, wherein a maximum dimension of the aperture is less than 15 mm larger than a maximum beam width of the one or more laser energy sources.

7. The additive manufacturing system of claim 1, wherein the first and second flow rates are between about 0.5 cm$^3$/s and about 1.5 cm$^3$/s.

8. The additive manufacturing system of claim 1, wherein the gas flow head further comprises a lower surface adjacent to the build surface and an upper surface positioned between the optics assembly and the lower surface.

9. The additive manufacturing system of claim 8, wherein the aperture is a first aperture positioned on the upper surface, and wherein the gas flow head further comprises a second aperture positioned on the lower surface.

10. The additive manufacturing system of claim 9, wherein the first aperture and the second aperture are aligned with one another.

11. The additive manufacturing system of claim 9, wherein the first aperture has a first maximum dimension ranging from 1 to 2 mm larger than a beam width of the one or more laser energy sources, and the second aperture has a second maximum dimension ranging from 5 to 15 mm larger than the first maximum dimension.

12. The additive manufacturing system of claim 9, further comprising an optical window covering the first aperture and arranged to permit transmission of laser energy through the first aperture.

13. The additive manufacturing system of claim 1, further comprising a gas velocity generator positioned within the gas flow head.

14. The additive manufacturing system of claim 13, wherein the gas velocity generator comprises a disc rotatable within the gas flow head to generate a gas velocity along a direction tangent to the rotation of the disc.

15. The additive manufacturing system of claim 14, wherein the disc is formed from an optically transparent material.

16. The additive manufacturing system of claim 1, further comprising one or more flow guides arranged to direct the flow of gas within the gas flow head.

17. The additive manufacturing system of claim 1, wherein the gas flow profile within the gas flow head is configured to entrain ejected particles and/or fumes generated by exposure of the layer of material to the laser energy.

18. The additive manufacturing system of claim 1, wherein the gas flow head further comprises a pair of baffle plates extending towards the build surface, wherein each baffle plate is substantially parallel to a scan direction of the gas flow head.

19. The additive manufacturing system of claim 18, wherein each baffle plate is selectively actuatable between an extended position and a retracted position.

20. An additive manufacturing system comprising:
 a build surface;
 one or more laser energy sources;
 an optics assembly movable relative to the build surface and configured to direct laser energy from the one or more laser energy sources toward the build surface, wherein exposure of a layer of material on the build surface to the laser energy melts at least a portion of the layer of material;
 a gas flow head coupled to the optics assembly and defining a partially enclosed volume between the optics assembly and the build surface, the gas flow head comprising:
  a gas inflow through which a supply gas flows into the gas flow head during operation of the gas flow head,
  a gas outflow through which a return gas flows out of the gas flow head during operation of the gas flow head, and
  an aperture arranged to permit transmission of the laser energy through the gas flow head to the build surface, wherein the supply gas and return gas define a gas flow profile within the gas flow head during operation of the gas flow head;
 a gas velocity generator positioned within the gas flow head, wherein the gas velocity generator comprises a disc rotatable within the gas flow head to generate a gas velocity along a direction tangent to the rotation of the disc.

21. The additive manufacturing system of claim 20, wherein the disc is formed from an optically transparent material.

* * * * *